US011305186B2

(12) United States Patent
Champy

(10) Patent No.: US 11,305,186 B2
(45) Date of Patent: *Apr. 19, 2022

(54) METHODS AND SYSTEMS FOR FACILITATING PARTICIPATION IN A GAME SESSION

(71) Applicant: GOOGLE LLC, Mountain View, CA (US)

(72) Inventor: Adam Champy, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/566,607

(22) Filed: Sep. 10, 2019

(65) Prior Publication Data
US 2020/0001177 A1  Jan. 2, 2020

Related U.S. Application Data

(63) Continuation of application No. 15/599,408, filed on May 18, 2017, now Pat. No. 10,456,672.
(Continued)

(51) Int. Cl.
A63F 13/335 (2014.01)
H04L 67/146 (2022.01)
(Continued)

(52) U.S. Cl.
CPC .......... A63F 13/335 (2014.09); A63F 13/33 (2014.09); A63F 13/355 (2014.09); A63F 13/48 (2014.09);
(Continued)

(58) Field of Classification Search
CPC ...... A63F 13/335; A63F 13/77; A63F 13/355; A63F 13/33; A63F 13/48; A63F 13/533;
(Continued)

(56) References Cited

U.S. PATENT DOCUMENTS 5,892,897 A    4/1999  Carlson et al.
6,855,058 B2   2/2005  Kubota et al.
(Continued)

FOREIGN PATENT DOCUMENTS

CN    101068258 A    11/2007
CN    101887485 A    11/2010
(Continued)

OTHER PUBLICATIONS

S. M. Malfatti, F. F. dos Santos and S. R. dos Santos, "Using Mobile Phones to Control Desktop Multiplayer Games," 2010 Brazilian Symposium on Games and Digital Entertainment, 2010, pp. 230-238, doi: 10.1109/SBGAMES.2010.32. (Year: 2010).*
(Continued)

Primary Examiner — Patrice L Winder

(57) ABSTRACT

A method performed at an electronic device includes: executing an application; establishing a session between the executing application, a remote server associated with the application, and a media device that transmits output from the session to an output device, wherein the output from the session includes output from the executing application; and presenting to users of one or more second electronic devices on which the application is not executing and/or installed a session identifier associated with the session, wherein the session identifier identifies a controller configuration for enabling the users of the one or more second electronic devices to interact with the session.

14 Claims, 12 Drawing Sheets

Related U.S. Application Data

(60) Provisional application No. 62/339,052, filed on May 19, 2016.

(51) Int. Cl.
| | |
|---|---|
| *H04L 67/00* | (2022.01) |
| *H04L 67/131* | (2022.01) |
| *A63F 13/48* | (2014.01) |
| *A63F 13/33* | (2014.01) |
| *A63F 13/355* | (2014.01) |
| *A63F 13/77* | (2014.01) |
| *A63F 13/533* | (2014.01) |

(52) U.S. Cl.
CPC ............ *A63F 13/77* (2014.09); *H04L 67/146* (2013.01); *H04L 67/34* (2013.01); *H04L 67/38* (2013.01); *A63F 13/533* (2014.09)

(58) Field of Classification Search
CPC ....... A63F 13/323; H04L 67/38; H04L 67/34; H04L 67/146
See application file for complete search history.

(56) References Cited

U.S. PATENT DOCUMENTS

| | | | |
|---|---|---|---|
| 7,401,150 B2 | 7/2008 | Shea et al. | |
| 7,774,440 B1 | 8/2010 | Bagrodia | |
| 8,171,145 B2 * | 5/2012 | Allen | H04L 61/2567 |
| | | | 709/227 |
| 8,619,588 B2 | 12/2013 | Karacali-Akyamac | |
| 8,621,585 B2 | 12/2013 | Danieli et al. | |
| 8,641,531 B2 * | 2/2014 | Patil | A63F 13/327 |
| | | | 463/42 |
| 9,208,642 B2 | 12/2015 | Merari | |
| 9,295,915 B2 | 3/2016 | Bruno, Jr. et al. | |
| 9,339,733 B2 | 5/2016 | Boudville | |
| 9,393,486 B2 * | 7/2016 | George | A63F 13/00 |
| 9,396,702 B2 | 7/2016 | Colenbrander | |
| 9,498,711 B2 * | 11/2016 | Assa | G06F 3/0488 |
| 9,526,989 B2 * | 12/2016 | Oh | A63F 13/77 |
| 9,592,446 B2 | 3/2017 | Bono et al. | |
| 9,628,332 B2 | 4/2017 | Bruno, Jr. et al. | |
| 9,675,874 B1 | 6/2017 | Park | |
| 9,912,562 B2 | 3/2018 | Callahan et al. | |
| 10,166,471 B2 * | 1/2019 | Vincent | A63F 13/2145 |
| 10,244,765 B2 | 4/2019 | Pierce et al. | |
| 10,255,765 B2 | 4/2019 | Washington et al. | |
| 10,486,066 B2 * | 11/2019 | Perry | A63F 13/77 |
| 11,128,636 B1 | 9/2021 | Jorasch et al. | |
| 2004/0198403 A1 | 10/2004 | Pedersen et al. | |
| 2005/0074063 A1 | 4/2005 | Nair et al. | |
| 2006/0154710 A1 | 7/2006 | Serafat | |
| 2006/0287096 A1 | 12/2006 | O'Kelley | |
| 2006/0287099 A1 | 12/2006 | Shaw et al. | |
| 2007/0018980 A1 | 1/2007 | Berteig et al. | |
| 2007/0203768 A1 | 8/2007 | Adra | |
| 2007/0293319 A1 * | 12/2007 | Stamper | A63F 13/75 |
| | | | 463/42 |
| 2008/0220878 A1 * | 9/2008 | Michaelis | A63F 13/34 |
| | | | 463/42 |
| 2009/0008404 A1 | 1/2009 | Kim et al. | |
| 2009/0119730 A1 | 5/2009 | Perlman et al. | |
| 2009/0125961 A1 | 5/2009 | Perlman et al. | |
| 2009/0271656 A1 | 10/2009 | Yokota et al. | |
| 2010/0073712 A1 | 3/2010 | Cain | |
| 2010/0167809 A1 | 7/2010 | Perlman et al. | |
| 2010/0203952 A1 | 8/2010 | Zalewski | |
| 2010/0306813 A1 | 12/2010 | Perry et al. | |
| 2011/0124417 A1 | 5/2011 | Baynes et al. | |
| 2011/0145635 A1 | 6/2011 | Buckler et al. | |
| 2012/0004042 A1 | 1/2012 | Perry | |
| 2012/0079080 A1 * | 3/2012 | Pishevar | A63F 13/77 |
| | | | 709/220 |
| 2012/0209571 A1 | 8/2012 | Peterson et al. | |
| 2012/0270644 A1 | 10/2012 | Buhr | |
| 2012/0306877 A1 | 12/2012 | Rosasco | |
| 2013/0017443 A1 | 1/2013 | Yamazaki | |
| 2013/0034160 A1 | 2/2013 | Schmit | |
| 2013/0198642 A1 | 8/2013 | Carney et al. | |
| 2013/0221923 A1 | 8/2013 | Robertson | |
| 2013/0274000 A1 | 10/2013 | Novotny et al. | |
| 2014/0006517 A1 | 1/2014 | Hsiao et al. | |
| 2014/0019582 A1 | 1/2014 | Kim | |
| 2014/0032670 A1 | 1/2014 | Ellingson | |
| 2014/0043333 A1 | 2/2014 | Narayanan et al. | |
| 2014/0066195 A1 * | 3/2014 | Matsui | A63F 13/06 |
| | | | 463/30 |
| 2014/0179426 A1 | 6/2014 | Perry et al. | |
| 2014/0179434 A1 | 6/2014 | Xu | |
| 2014/0221087 A1 | 8/2014 | Huang et al. | |
| 2014/0274380 A1 * | 9/2014 | Kazama | A63F 13/77 |
| | | | 463/31 |
| 2014/0274384 A1 | 9/2014 | Boswell et al. | |
| 2014/0342168 A1 | 11/2014 | Bruno, Jr. et al. | |
| 2015/0009222 A1 | 1/2015 | Diard et al. | |
| 2015/0024842 A1 | 1/2015 | Imai et al. | |
| 2015/0087414 A1 | 3/2015 | Chen et al. | |
| 2015/0109185 A1 | 4/2015 | Shimamura et al. | |
| 2015/0297998 A1 * | 10/2015 | Karamfilov | A63F 13/352 |
| | | | 463/42 |
| 2016/0001184 A1 * | 1/2016 | Sepulveda | G07F 17/323 |
| | | | 463/31 |
| 2016/0028854 A1 | 1/2016 | Leeb et al. | |
| 2016/0171757 A1 | 6/2016 | Panneer et al. | |
| 2016/0279523 A1 * | 9/2016 | Altagar | A63F 13/2145 |
| 2016/0293134 A1 | 10/2016 | Fortin | |
| 2016/0317921 A1 | 11/2016 | Schmitz et al. | |
| 2016/0354688 A1 * | 12/2016 | Harkham | G07F 17/3276 |
| 2017/0007659 A1 | 1/2017 | Wadhwa et al. | |
| 2017/0034234 A1 | 2/2017 | Zimring et al. | |
| 2017/0083396 A1 | 3/2017 | Bishop et al. | |
| 2017/0097816 A1 * | 4/2017 | Joshi | H04L 67/34 |
| 2017/0124812 A1 | 5/2017 | Washington et al. | |
| 2017/0142201 A1 | 5/2017 | Holmes | |
| 2017/0185464 A1 | 6/2017 | Lipinski et al. | |
| 2017/0246544 A1 * | 8/2017 | Agarwal | A63F 13/35 |
| 2017/0354878 A1 | 12/2017 | Posin | |
| 2017/0354893 A1 * | 12/2017 | Benedetto | A63F 13/88 |
| 2018/0176282 A1 * | 6/2018 | Benguerah | H04L 67/02 |
| 2018/0229128 A1 * | 8/2018 | Chandrasekaran | A63F 13/87 |
| 2018/0250591 A1 * | 9/2018 | Prado Rojas | H04L 67/02 |
| 2018/0253880 A1 | 9/2018 | Yeh et al. | |
| 2018/0256981 A1 | 9/2018 | Enomoto | |
| 2019/0199722 A1 | 6/2019 | Pennarun et al. | |
| 2019/0259130 A1 | 8/2019 | Yeh et al. | |
| 2019/0262723 A1 | 8/2019 | Trombetta et al. | |
| 2019/0272707 A1 | 9/2019 | Washington et al. | |
| 2019/0308099 A1 | 10/2019 | Lalonde et al. | |
| 2019/0321725 A1 | 10/2019 | Zimring et al. | |
| 2019/0321727 A1 | 10/2019 | Rodgers | |
| 2019/0321732 A1 | 10/2019 | Zimring et al. | |
| 2020/0111317 A1 | 4/2020 | Oberberger et al. | |
| 2021/0146240 A1 | 5/2021 | Colenbrander | |

FOREIGN PATENT DOCUMENTS

| | | | |
|---|---|---|---|
| CN | 102195935 A | 9/2011 | |
| CN | 104598292 A | 5/2015 | |
| CN | 105749551 A | 7/2016 | |
| CN | 106328855 A | 1/2017 | |
| CN | 107050858 A | 8/2017 | |
| CN | 107666943 A | 2/2018 | |
| CN | 107670275 A | 2/2018 | |
| EP | 1 374 959 A2 | 1/2004 | |
| EP | 2 546 811 A1 | 1/2013 | |
| EP | 2621594 B1 * | 8/2016 | ............ H04L 67/34 |
| EP | 3 610 933 A1 | 2/2020 | |
| GB | 2525437 A | 10/2015 | |
| JP | 2014130589 A | 7/2014 | |
| JP | 2015139565 A | 8/2015 | |
| KR | 20070082395 | 8/2007 | |

(56) References Cited

FOREIGN PATENT DOCUMENTS

| WO | WO-2004004857 A1 * | 1/2004 | ......... A63F 13/5372 |
|---|---|---|---|
| WO | WO 2005/010680 A2 | 2/2005 | |
| WO | 2005074063 A2 | 8/2005 | |
| WO | 2007044908 A2 | 4/2007 | |
| WO | 2008104221 A1 | 4/2008 | |
| WO | 2012161102 A1 | 11/2012 | |
| WO | WO 2012/170437 A1 * | 12/2012 | ............ A63F 13/42 |
| WO | 2013151748 A2 | 10/2013 | |
| WO | 2014085717 A1 | 6/2014 | |
| WO | 2014120369 A1 | 8/2014 | |
| WO | 2014186858 A1 | 11/2014 | |
| WO | 2015098165 A2 | 7/2015 | |
| WO | 2015164397 A2 | 10/2015 | |
| WO | 2015175231 A2 | 11/2015 | |
| WO | 2015191965 A2 | 12/2015 | |
| WO | 2016183253 A1 | 11/2016 | |
| WO | 2017007659 A1 | 1/2017 | |
| WO | 2019074952 A2 | 4/2019 | |
| WO | 2019182752 A1 | 9/2019 | |
| WO | 2019195300 A2 | 10/2019 | |
| WO | 2020102493 A1 | 5/2020 | |

OTHER PUBLICATIONS

N. Veljkovic, M. Punt, M. Z. Bjelica and N. Crvenkovic, "TV-centric multiplayer gaming over the cloud for consumer electronic devices," 2013 IEEE Third International Conference on Consumer Electronics ¿ Berlin (ICCE-Berlin), 2013, pp. 1-3, doi: 10.1109/ICCE-Berlin.2013.6697989. (Year: 2013).*
Google LLC, International Preliminary Report on Patentability, Int. App. No. PCT/US2017/033642, dated Apr. 24, 2018, 12 pgs.
Google Inc, International Search Report / Written Opinion, Int. App. No. PCT/US2017/033642, dated Nov. 23, 2017, 11 pgs.
Extended European Search Report dated Jan. 3, 2020 for EP Application No. EP 19199853.3, 10 pages.
Notice of Grant dated Nov. 5, 2019 for JP Application No. JP 2019220516, 7 pages. English machine translation included.
English Translation of Korean Notice of Allowance dated Jan. 28, 2020 for KR Application No. KR 10-2018-7023961, 3 pages.
English Translation of Korean Office Action dated Apr. 15, 2019 for KR Application No. KR 10-2018-7023961, 2 pages.
International Search Report and Written Opinion dated Feb. 26, 2019 for International Application No. PCT/US2018/066844, 13 pages.
Non-Final Office Action dated May 15, 2020 for U.S. Appl. No. 15/851,610, 15 pages.
International Search Report and Written Opinion dated Feb. 24, 2020 for International Application No. PCT/US2019/061407, 13 pages.
International Preliminary Report on Patentability dated Apr. 14, 2020 for International Application No. PCT/US2018/055055, 13 pages.
International Search Report and Written Opinion dated Apr. 26, 2019 for International Application No. PCT/US2018/055055, 21 pages.
International Search Report and Written Opinion dated Oct. 4, 2019 for International Application No. PCT/US2019/025182, 23 pages.
First Action Interview Pilot Program Pre-Interview Communication dated Apr. 9, 2020 for U.S. Appl. No. 16/368,801, 4 pages.
Notice of Allowance dated Jun. 10, 2020 for U.S. Appl. No. 16/368,801, 12 pages.
International Search Report and Written Opinion dated Jun. 18, 2019 for International Application No. PCT/US2019/025185, 11 pages.
Notice of Allowance dated May 5, 2020 for U.S. Appl. No. 16/368,806, 8 pages.
International Search Report and Written Opinion dated Jun. 18, 2019 for International Application No. PCT/US2019/022472, 13 pages.
Non-Final Office Action dated Jun. 22, 2020 for U.S. Appl. No. 16/373,558, 6 pages.
International Search Report and Written Opinion dated Sep. 20, 2019 for International Application No. PCT/US2019/026611, 26 pages.
First Action Interview Pilot Program Pre-Interview Communication dated May 21, 2020 for U.S. Appl. No. 16/380,831, 4 pages.
International Search Report and Written Opinion dated Aug. 1, 2019 for International Application No. PCT/US2019/020935, 23 pages.
International Search Report and Written Opinion dated Oct. 7, 2019 for International Application No. PCT/US2019/025400, 13 pages.
Bernier, Yahn W., "Latency Compensating Methods in Client/Server In-game Protocol Design and Optimization", Game Developers Conference Proceedings, Mar. 20, 2001, 13 pages.
Herrscher et al., "A Dynamic Network Scenario Emulation Tool", Proceedings of the IEEE Eleventh International Conference on Computer Communications and Networks, Oct. 16, 2002; pp. 262-267.
Noble et al., "Trace-Based Mobile Network Emulation", Proceedings of the ACM SIGCOMM'97 Conference on Applications, Technologies, Architectures, and Protocols for Computer Communication; Oct. 1, 1997; pp. 51-61.
Ra-Qin, "Ra-Qin Review of the Activision Decathlon—Gamespot," Sep. 2, 2006; XP055625157; retrieved from www.gamespot.com/the-activision-decathlon/user-reviews/2200-128501/ on Sep. 23, 2019; 3 pages.
Slivar, Ivan et al., "Empirical QoE Study of In-Home Streaming of Online Games", 2014 13th Annual Workshop on Network and Systems Support for Games, IEEE, Dec. 4, 2014, 6 pages.
Yoneda, Satoshi, "Completed Understanding of Windows 8 as a Game Environment (6) Windows Store App Version Game and Xbox Smart Glass," Oct. 30, 2012; 22 pages; accessed on Aug. 5, 2020 from https://www.4gamer.net/games/126/G012689/20121029010/.
English Translation of Korean Office Action dated Aug. 18, 2018 for KR Application No. KR 10-2020-7002403, 5 pages.
International Preliminary Report on Patentability dated Oct. 15, 2020 for International Application No. PCT/US2019/025182, 18 pages.
International Preliminary Report on Patentability dated Oct. 15, 2020 for International Application No. PCT/US2019/025185, 7 pages.
International Preliminary Report on Patentability dated Oct. 15, 2020 for International Application No. PCT/US2019/022472, 8 pages.
Final Office Action dated Nov. 30, 2020 for U.S. Appl. No. 15/851,610, 33 pages.
Notice of Allowance dated Sep. 17, 2020 for U.S. Appl. No. 16/373,558, 9 pages.
First Action Interview Office Action dated Sep. 2, 2020 for U.S. Appl. No. 16/380,831, 4 pages.
Office Action dated Feb. 19, 2021 for European Patent Application No. 18797260.9, 6 pages.
Yadav, Himanshu, et al., "Adaptive GPU Resource Scheduling on Virtualized Servers in Cloud Gaming", Conference on Information and Communication Technology, Nov. 2017, 6 pages.
Notice of Allowance dated Dec. 30, 2020 for U.S. Appl. No. 16/380,831, 72 pages.
Notice of Allowance dated Aug. 11, 2021 for U.S. Appl. No. 16/849,805, 54 pages.
First Examination Report dated Jun. 26, 2021 for Indian Application No. 202047027952, 6 pages.
English Translation of Japanese Office Action dated May 18, 2021 for JP Application No. 2019-220516, 7 pages.
Notice of Allowance dated May 17, 2021 for U.S. Appl. No. 15/851,610, 23 pages.
English Translation of Chinese Office Action dated May 21, 2021 for CN Application No. 20198029685.3, 15 pages.
Extended European Search Report dated May 21, 2021 for EP Application No. EP 21169156.3, 9 pages.

(56) References Cited

OTHER PUBLICATIONS

IT Media News, "Google launches new "Chromecast" and "Chromecast Audio" in Japan for JPY4,980"], Feb. 18, 2016, search date Apr. 30, 2021, URL https://www.itmedia.co.jp/news/articles/1602/18/news101.html.
Weekly Ascii, "Angry Birds Friends, a smartphone game to compete for high score with Facebook friends", May 31, 2013, URL https://weekly.ascii.jp/elem/000/002/615/2615748/.
English Translation of Chinese Office Action dated Aug. 11, 2021 for CN Application No. 201980007131.3, 21 pages.
Non-Final Office Action dated Nov. 26, 2021 for U.S. Appl. No. 15/734,275, 24 pages.
English Translation of Chinese Office Action dated Oct. 18, 2021, 10 pages.
Non-Final Office Action dated Nov. 29, 2021 for U.S. Appl. No. 17/123,523, 7 pages.
English Translation of Korean Notice of Allowance dated Nov. 5, 2021 for KR Application No. 10-2020-7015094, 3 pages.
Ikeda, Takatoshi et. al., "An Instruction Allocation Method for Accelerating GPU Applications", Journal of Information Processing, Aug. 15, 2005, vol. 46, SIG12(ACS11), p. 140-149.

* cited by examiner

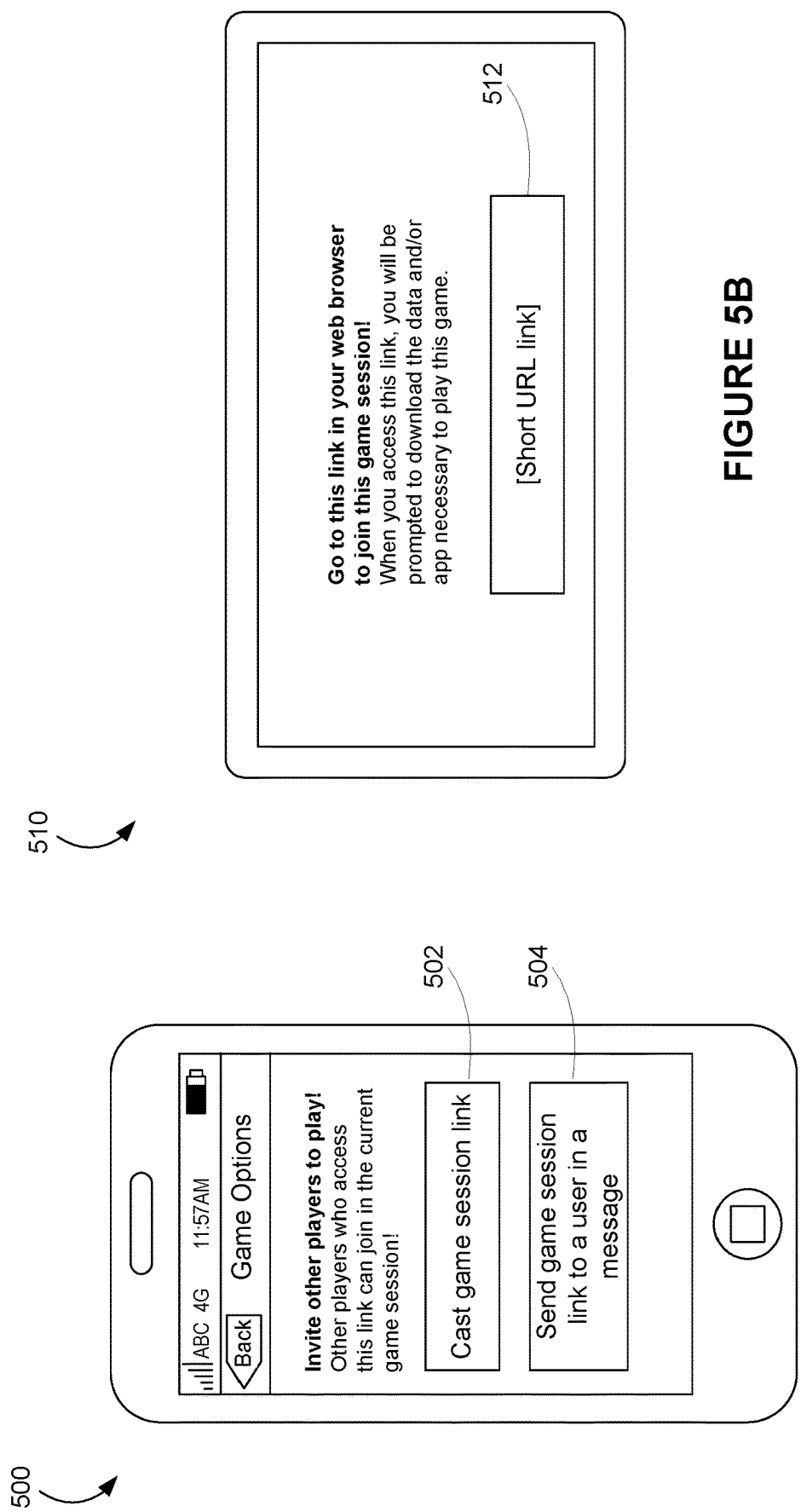

METHODS AND SYSTEMS FOR FACILITATING PARTICIPATION IN A GAME SESSION

RELATED APPLICATIONS

This application is a continuation of U.S. patent application Ser. No. 15/599,408, filed May 18, 2017, which claims the benefit of U.S. Provisional Patent Application No. 62/339,052, filed May 19, 2016, each of which is incorporated by reference herein in its entirety.

TECHNICAL FIELD

This application relates generally to computer technology, including but not limited to methods and systems for facilitating participation of users in a game session.

BACKGROUND

Media player devices, such as CHROMECAST by Google Inc. and APPLE TV by Apple Inc., can support a variety of media and entertainment applications. A group of multiple users can gather in one space that has a media player device equipped and enjoy together the entertainment derived from these applications.

One type of application supported by media player devices is gaming applications. Many games are best enjoyed when played by multiple players, but multi-player support in gaming applications that run on or use media player devices present some challenges. For example, file sizes of game applications can be quite large, and getting each potential player to download the full game application file can be difficult, as such downloads can consume much time and data allowances. As another example, users can be confused by the need for separate downloads of a main game application for a game and a remote or controller application specific to the game. These inefficiencies increase the costs of playing a multi-player game, and can be quite prohibitive for, for example, spontaneous gameplay by multiple users gathered in one space.

SUMMARY

The implementations described in this specification are directed to facilitating multiplayer game sessions where one user has the game application on his or her device (e.g., smartphone) but the other players might not.

In some implementations, a standardized controller with a customizable framework is presented in an application that can control a device or be delivered via the web and possibly integrated into a web browser. The game experience may be prompted to other players by them going to either a session specific shortlink or receiving a message (e.g., a text message with the shortlink). The controller is presented to the user who has the application that works across multiple games, with game-specific customizations as appropriate. The controller may include a region of standardized keys, or a concept for standardized keys for either two-handed or one-handed or non-visible control with a region available to the developer to make use of a second screen interaction model.

The described implementations allow users of a casting device application to have a high quality game controller in their hands while standardizing infrastructure for game developers. The described implementations have an advantage of facilitating multiplayer gaming by making setting up multiplayer gaming sessions more efficient.

In accordance with some implementations, a method is performed at an electronic device having one or more processors and memory storing one or more programs for execution by the one or more processors. The method includes: executing an application; establishing a session between the executing application, a remote server associated with the application, and a media device that transmits output from the session to an output device, where the output from the session includes output from the executing application; and presenting to second users of one or more second electronic devices on which the application is not executing and/or installed a session identifier associated with the session, where the session identifier facilitates joining of the session by the second electronic devices and identifies a controller configuration implementable on each of the one or more second electronic devices for enabling the second users of the one or more second electronic devices to interact with the session.

In accordance with some implementations, a method is performed at an electronic device having one or more processors and memory storing one or more programs for execution by the one or more processors. The method includes: receiving instructions to establish a session with an application executing on a second electronic device and a remote server associated with the application; establishing the session in accordance with the received instructions; receiving a session identifier associated with the session, where the session identifier facilitates joining of the session by one or more third electronic devices and identifies a controller configuration implementable on each of the one or more third electronic devices for enabling one or more users of the third electronic devices to interact with the session; transmitting the session identifier to an output device for display.

In accordance with some implementations, an electronic device includes one or more processors and memory storing one or more programs to be executed by the one or more processors. The one or more programs include instructions for performing any of the methods described above. In accordance with some implementations, a non-transitory computer-readable storage medium stores one or more programs, the one or more programs include instructions, which, when executed by an electronic device with one or more processors, cause the electronic device to perform any of the methods described above.

BRIEF DESCRIPTION OF THE DRAWINGS

FIGS. 5A-5B illustrate example user interfaces in accordance with some implementations.

Like reference numerals refer to corresponding parts throughout the drawings.

DESCRIPTION OF IMPLEMENTATIONS

In various implementations described in this application, a gaming environment includes a media device (e.g., a casting device) coupled to an output device, and a first client device communicatively coupled to the media device. An application (e.g., a game application) is executed on the first client device. A session is established between the executing application and a remote server, as well as the media device. An identifier of the session (e.g., a link) may be presented to users of one or more second client devices, where the users may use the session identifier to join the session. The session and the session identifier are also associated with a controller configuration that facilitates interaction with the session at the second client devices. In this manner, a session associated with an interactive application may be initiated at a host client, and additional clients, including clients that do not have the application installed, may be invited to and onboarded onto the session in a more efficient manner. Additionally, in this manner, a common input interface for the session may be provided to the host client and additional clients in the session.

Figure 1A:
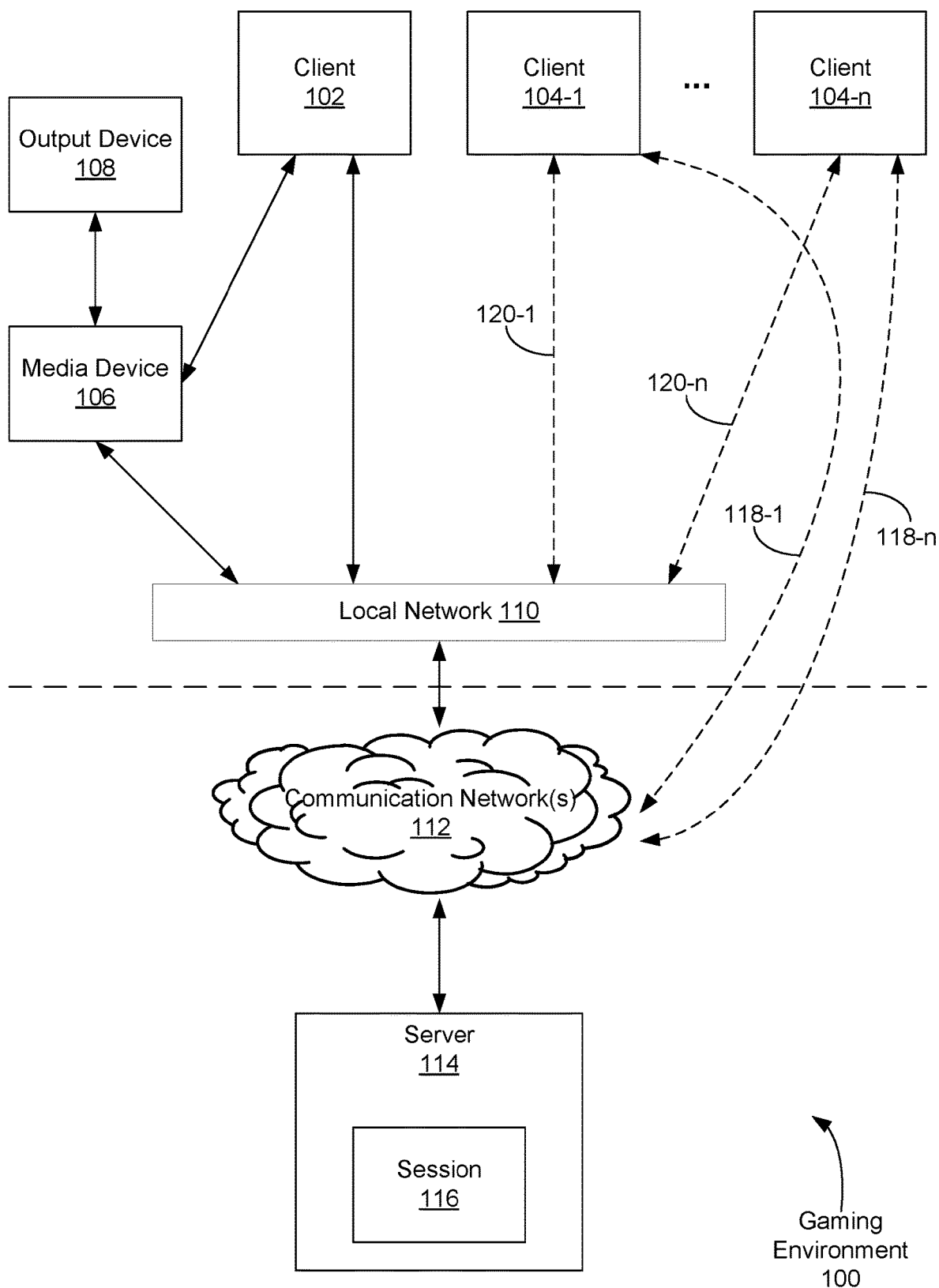
FIG. 1A is an example gaming environment in accordance with some implementations.

FIG. 1A is an example gaming environment 100 in accordance with some implementations. The gaming environment 100 includes a client device 102 and a media device 106 on a local network 110. In some implementations, the local network 110 networks one or more devices using wired (e.g., Ethernet) and/or wireless (e.g., Wi-Fi) communications. For example, the local network 110 includes a router device that networks one or more devices into the local network 110. The local network 110 is communicatively coupled to communication networks 112 (e.g., wide-area networks, the Internet).

The client device 102 and the media device 106 are communicatively coupled. The client device 102 and the media device 106 may communicate with each other through the local network 110 and/or directly (e.g., via Bluetooth or other wireless communications). In some implementations, the client device 102 and the media device 106 are local to each other (e.g., in the same room, in the same house, etc.). The media device 106 is coupled to one or more output devices 108 that can output visual and/or audio content (e.g., a television, a display monitor, a sound system, speakers, etc.). The media device 106 is configured to output content to the output device(s) 108. In some implementations, the media device 106 is a casting device (e.g., CHROMECAST by Google Inc.) or a device that otherwise includes casting functionality.

The client device 102 is a device that includes, and can run, one or more applications. In some implementations, the client device 102 is a smartphone, tablet device, a laptop or notebook computer, a desktop computer, or a multimedia device.

In some implementations, the client device 102 includes one or more applications that are configured to operate in conjunction with the media device 106. In some implementations, the applications include a media device application for pairing the client device 102 with the media device 106 and configuring the media device 106. The applications also include one or more applications that can cast associated content to the media device 106. In some implementations, an application casts data and/or content to the media device 106 by sending the data/content directly to the media device 106 (e.g., via the local network 110) and/or by directing the media device 106 to a remote location (e.g., a Universal Resource Locator ("URL") or other link to a location at a server system) from which the media device 106 can stream or otherwise receive data/content. The media device 106 receives data/content from the application and/or the remote location and outputs visual and/or audio content corresponding to the received data/content to the output device 108.

In the gaming environment 100, a user (hereinafter the "host user") of the client device 102 (hereinafter the "host client") can start a game by launching a game application (e.g., game application 228, FIG. 2A) for execution at the host client 102. The executing game application communicates with a server 114 to establish a game session 116 at the server 114. In some implementations, the user can also instruct the game application to communicate with the media device 106 to direct the media device 106 to receive data associated with the game session for outputting. Thus, a session 116 is established between the game application, the remote server 114, and the media device 106.

The host user can invite additional players to join the game. An identifier of the session 116 may be presented to users (hereinafter "player user(s)") of one or more client devices 104 (hereinafter "player client(s)"). In some implementations, the session identifier is or otherwise includes an Internet link (e.g., a short URL). In some implementations, the session identifier is outputted on the output device 108 through the media device 106. For example, the session identifier is displayed on a display coupled to the media device 106; the session identifier is received by the media device 106 from the host client 102 or the server 114. In some other implementations, the session identifier is sent to player clients 104 in messages (e.g., in a text message). In some further implementations, the session identifier is presented on player clients 104 in a notification message (e.g., a smartphone notification). For example, when one or more player clients 104 are determined to be in the local area (e.g., in the same room) of the host client 102, the session identifier may be transmitted to these player clients 104. The player clients 104 display a notification that informs the player users of an invitation to join the session. If the player user opens the notification, the player user may access the session identifier directly from the notification or activate an affordance to display the session identifier (e.g., in another application).

The session identifier may be used at a player client 104 to join the session 116. In some implementations, the session identifier is a link (e.g., a Universal Resource Locator ("URL")) of the session 116. The link or an encoding of the link (e.g., a QR code) may be displayed by the output device 108 or sent to player devices 104 in messages.

When the session identifier is used at a player client 104 (e.g., the session identifier link is activated), the player client 104 communicates with the server 114 in order to join the session 116. After the player client 104 joins the session 116, player users can play the game along with the host user, i.e., make inputs that affect the output of the session 116.

In some implementations, if the player client 104 is already on the local network 110 (e.g., connected to the local network through connection 120) of the host client 102, communications between the server 114 and the player client 104 go through the local network 110. If the player client 104 is not on the local network 110 of the host client 102, communications between the server 114 and the player client 104 go through a different connection (e.g., connection 118 through cellular data networks).

In some implementations, as part of the process of the player client 104 joining the session 116, the server 114 accesses the capabilities of the player client 104 and/or a quality of the communicative connection between the server 114 and the player client 104. In some implementations, the server 114 measures network latency between the client 104 and the server 114. If the measured latency is above a threshold and a lower-latency connection is available, the server 114 can suggest that the player client 104 change to the lower latency connection, or invite the player user of the player client 104 to change the player client 104 to the lower latency connection. For example, if the player client 104 is on a cellular wireless connection 118, and the host user's local network 110 is available, the server 114 can suggest that the player client 104 should connect through the local network 110.

In some implementations, the latency threshold requirements differ between games. For example, some games (e.g., action games) are best experienced on lower latency connections, and some other games (e.g., online board games or card games) are not as demanding with respect to latency, and the server 114 may make connection recommendations in view of these different requirements.

In some implementations, the server 114 invites the player client 104 to a lower latency connection (e.g., the local network 110) or otherwise facilitates connection of the player client 104 to the lower latency connection. For example, the server 114 can present, or instruct the host client 102 or the media device 106 to present, access credentials to the local network 110 (e.g., Wi-fi username and password for the router of the local network 110). In some implementations, the access credentials are time-limited (e.g., for just the duration of the session 116, for just the current day, etc.) and/or session-limited.

As part of the player client 104 joining the session 116, the server 114 communicates with the player client 104 to set up a controller on the player client 104. In some implementations, this includes the server 114 assessing whether the player client 104 has the needed resources for the controller, including whether the player client 104 has an application needed to implement the virtual controller and/or whether the communicative connection between the player client 104 and the server 114 has a latency that is appropriate for the game session (e.g., as part of the capabilities and connection quality assessment described above). Depending on the available resources at the player client 104, the connection quality, and the requirements for the game, the controller may be implemented differently at the player client 104.

In some implementations, a standardized controller is implemented in a predefined application not specific to the game or directly associated with the game (e.g., a casting device application, such as CHROMECAST or GOOGLE CAST by Google Inc., or other media device application), or in the operating system of the player client 104. For example, the device operating system or a predefined application on the player client 104 may have a controller sub-module. The controller sub-module includes one or more standardized controller configurations, templates, or the like. Each of the standardized controller configurations configures the controller sub-module to utilize input devices and/or sensors on the player client 104 in some way to implement a virtual controller. Which standardized controller configuration is used may vary by the game and/or by the type of player client 104. For example, if the player client 104 is a mobile device with a touch screen, a standardized controller configuration that implements a virtual controller pad displayed on, and utilizing the touch screen, is used. The virtual controller pad may include virtual buttons, a virtual directional pad, and/or a virtual joystick. As another example, if the player client 104 is a laptop or desktop computer with a physical keyboard, a standardized controller configuration that maps keys of the physical keyboard to controller functions may be used. As a further example, on a player client 104 that includes sensors (e.g., an accelerometer) and for games that use motion of the player client 104 as an input, a standardized controller configuration that turns the player client 104 into a motion controller with optionally one or more virtual buttons displayed on the touch screen is used.

A standardized controller configuration may be used by multiple games, and is the same across the different games that use that standardized controller configuration. The player client 104 is instructed on which standardized controller configuration to use as part of the process of joining the session 116. Further, the standardized controller configurations may also be used on the host client 102.

In some implementations, a game has a specific controller configuration that may be implemented on the controller sub-module. Such a configuration may be stored at the server 114 and transmitted to the host client 102 and player client 104, respectively, as part of the process of the host client 102 starting the session 106 and the player client 104 joining the session 116, respectively. The specific configuration may be stored or cached at the host client 102 and/or player client 104 for future use. The specific controller configuration may be applied to the controller sub-module; the controller sub-module acts as a blank canvas for the specific controller configuration. In some implementations, a specific controller configuration can be an entirely custom controller or a mix of standard controller and a custom controller or region.

In some implementations, a game requires a specific application associated with the game. For example, a game may require a controller application associated specifically with the game.

In some implementations, the player client 104 may be directed to download the specific application or the predefined application as part of joining the session 116. For example, if the player client 104 does not already have the predefined application (with the controller sub-module) or the specific application associated with game, and such an application is required for play, the server 114 instructs the player client 104 to prompt the player user that a download is needed and to ask the player user for permission to proceed.

In some implementations, a game can be played with a webpage-based controller interface. For example, a controller interface for the game may be embedded in a webpage, and the webpage is rendered in a web browser on the player client 104 (and/or the host client 102 as well). The player user then can interact with the controller interface in the webpage. If the webpage-based control interface is the controller of choice for the session 116, the server 114 transmits the control interface webpage to the player client 104 when the player client 104 joins the session.

In some implementations, which controller is used for a game session 116 is based on the game's specifications and/or the resources available at the client 102/104. For example, if the game requires a game-specific application to be downloaded, the player client 104 is checked for the presence of the application and a prompt to download sent if the application is not present. If the game does not require a game-specific application but instead utilizes a standardized controller configuration or a controller template for a controller sub-module, the player client 104 is checked for the presence of the controller sub-module and a prompt to download sent if the controller sub-module (e.g., in an application or an operating system update) is not present. If the controller sub-module is present, the controller configuration or template (e.g., the game-specific custom template, an indication of which standardized configuration to use) is transmitted to the player client 104. As a further example, if the game can use either a standardized controller configuration or a webpage-based interface, and the game does not require low-latency control, then a webpage-based interface may be used if the controller sub-module is not present, to avoid additional downloading.

In some implementations, the quality of the communicative connection between the player client 104 and the server 114 is checked, as noted above. For example, if the game has requirements with respect to latency and a connection through the cellular data networks does not meet that requirement, a prompt to switch to a higher-quality connection (e.g., a local area network connection) may be transmitted. For example, if the player client 104 is connecting 118 through the cellular data networks, and that connection 118 has too high latency for the game, the player user may be prompted to switch the player client 104 to a connection through a local network. If the player client 104 is in the same area as the host client 102 (e.g., in the same room), then the player client 104 can connect 120 to the same local network 110 as the host client 102. In some implementations, the media device 106 or the host client 102, or even the router for the local network 110, is instructed by the server 114 to provide the player client 104 with credentials to join the local network 110 (e.g., Wi-Fi credentials for the router of the local network 11). These credentials may be, for example, displayed on the output device 108 (and the player user enters the credentials manually or scans a code that encodes the credentials) or sent to the player client 104. These credentials may be temporary, e.g., per-session, for the day, or otherwise session-limited and/or time-limited.

After the player client 104 has joined the session 116 and has received the appropriate controller configuration, the player user can play the game on the player client 104 and influence the output from the game session 116.

Figure 1B:
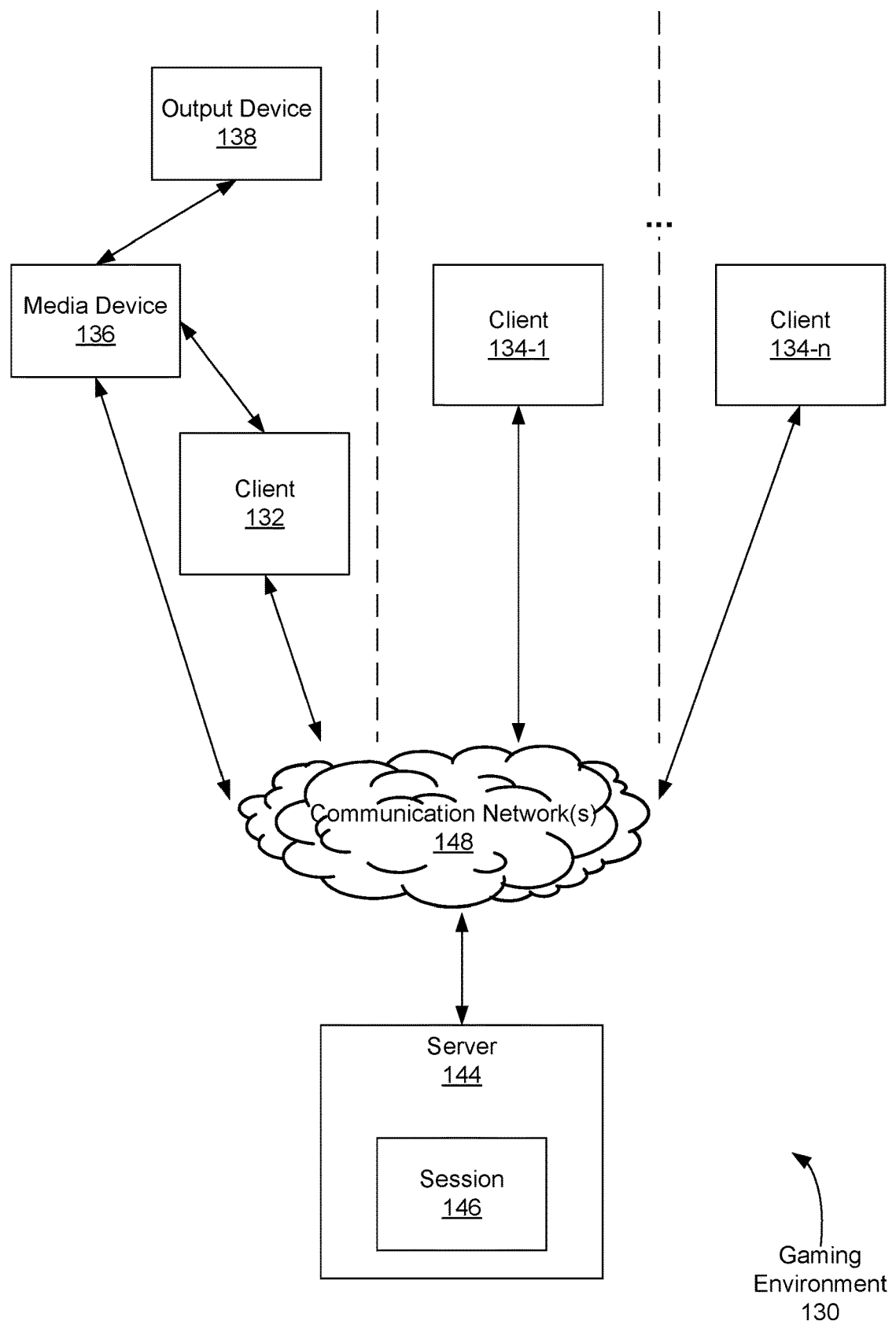
FIG. 1B is another example gaming environment in accordance with some implementations.

FIG. 1B illustrates another example gaming environment 130 in accordance with some implementations. In many respects, gaming environment 130 is similar to gaming environment 100. Client 132 is a host client of a host user, similar to client 102. Media device 136, which in gaming environment 130 is optional, is similar to media device 106. Output device 138 is similar to output device 108. Client(s) 134 are player client(s) of player user(s), similar to client(s) 104. Server 144 is similar to server 114, and communicates with client devices and other devices through one or more communication networks 148, which are similar to networks 112. Session 146 is similar to session 116; host client 132 first establish the session 146 with server 144 and player clients 134 join the session 146.

In gaming environment 130, host client 132 (and media device 136 and output device 138) are remote from player clients 134; the player users are remote from the host user. In other words, the player clients 134 are not located in the same area (e.g., in the same room or even structure) as the host client 134. As in FIG. 1A, a game may be started by launching a game application (e.g., game application 228, FIG. 2A) for execution at the host client 132. The executing game application establishes the session 146 with server 146. Player clients 134 are invited to join the session 146 by message; messages with the link to join the session are sent to the player clients 134. An appropriate controller configuration is provided to the player client 134 that joins the session 146. Also, in some implementations, the server 144 determines that the player client(s) 134 are not local to the host client 132 and omits prompting or facilitating provision of credentials to the player client(s) 134 to connect to the local network of the host client 132, instead optionally prompting the player client(s) 134 to connect to a local network that is available.

Figure 2A:
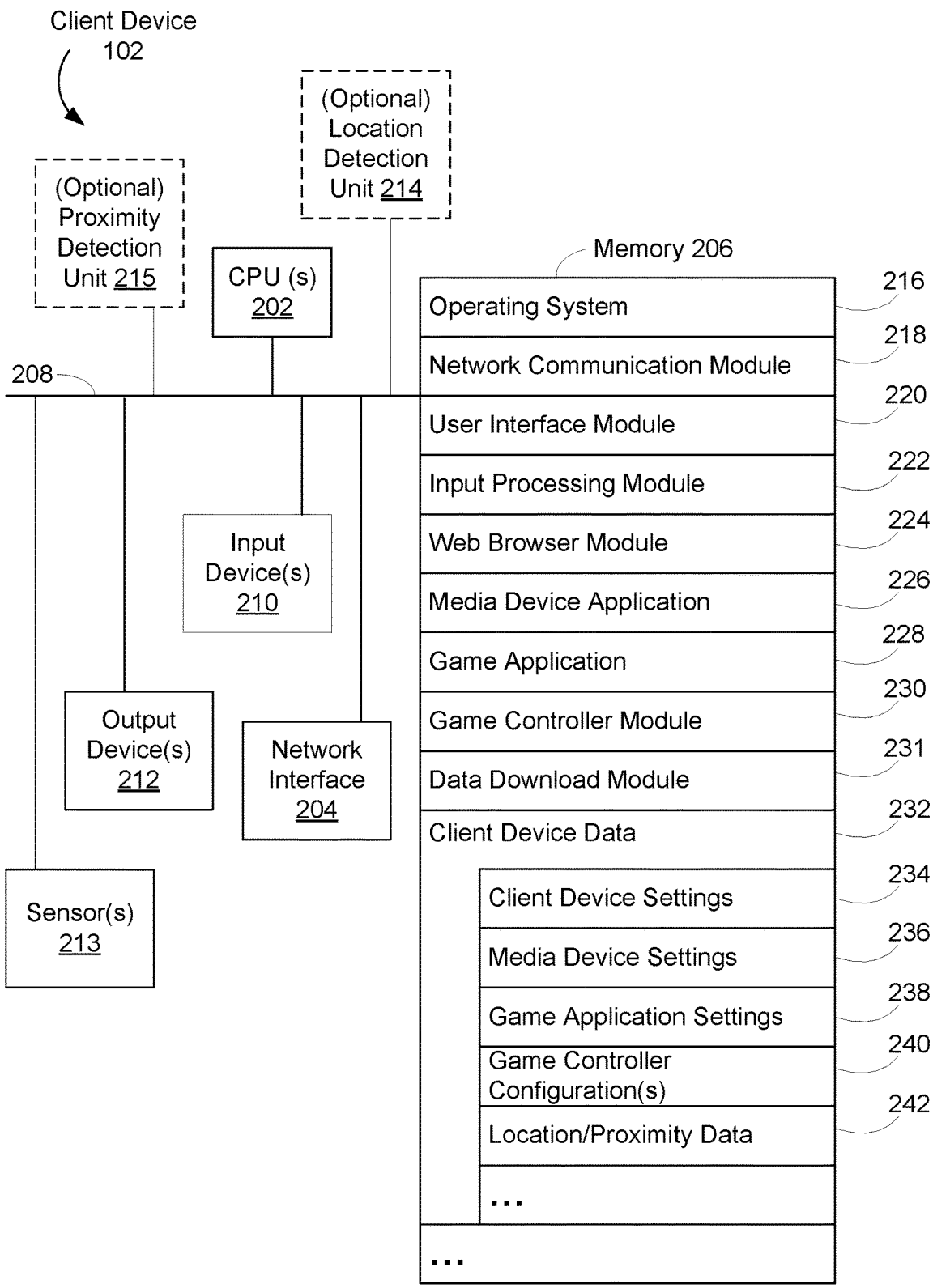
FIGS. 2A and 2B are block diagrams illustrating example client devices in accordance with some implementations.

FIG. 2A is a block diagram illustrating an example host client 102 of gaming environment 100 in accordance with some implementations. Examples of the client device 102 include, but are not limited to, a mobile phone, a tablet computer, a laptop computer, a desktop computer, a and a wearable personal device. The client device 102, typically, includes one or more processing units (CPUs) 202, one or more network interfaces 204, memory 206, and one or more communication buses 208 for interconnecting these components (sometimes called a chipset). The client device 102 includes one or more input devices 210 that facilitate user input, such as a keyboard, a mouse, a voice-command input unit or microphone, a touch screen display, a touch-sensitive input pad, a gesture capturing camera, or other input buttons or controls. Furthermore, some the client devices 102 use a microphone and voice recognition or a camera and gesture recognition to supplement or replace the keyboard. In some implementations, the client device 102 includes one or more cameras, scanners, or photo sensor units for capturing images, for example, of graphic series codes printed on the electronic devices. The client device 102 also includes one or more output devices 212 that enable presentation of user interfaces and display content, including one or more speakers and/or one or more visual displays. Optionally, the client device 102 includes a location detection device 214, such as a GPS (global positioning satellite) or other geo-location receiver, for determining the location of the client device 102. The client device 102 may also include a proximity detection device 215, e.g., an IR sensor, for determining a proximity of a media device 106 and/or of player clients 104. The client device 102 may also include one or more sensors 213 (e.g., accelerometer, gyroscope, etc.) for sensing motion, orientation, and other parameters of the client device 102, which may be used as input.

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

Operating system 216 including procedures for handling various basic system services and for performing hardware dependent tasks;

Network communication module 218 for connecting the client device 102 to other devices (e.g., the server system 114, the media device 106, and the player clients 104) via one or more network interfaces 204

(wired or wireless) and the local network 110 and one or more networks 112, such as the Internet, other wide area networks, local area networks, metropolitan area networks, and so on;

User interface module 220 for enabling presentation of information (e.g., a graphical user interface for presenting applications, widgets, websites and web pages thereof, and/or games, audio and/or video content, text, etc.) at the client device 102 via one or more output devices 212 (e.g., displays, speakers, etc.);

Input processing module 222 for detecting one or more user inputs or interactions from one of the one or more input devices 210 and interpreting the detected input or interaction;

Web browser module 224 for navigating, requesting (e.g., via HTTP), and displaying websites and web pages thereof, including a web interface for joining the session 116;

Media device application 226 for interacting with a media device 106, including logging into a user account associated with the media device 106, controlling the media device 106 if associated with the user account, and editing and reviewing settings and data associated with the media device 106;

Game application(s) 228 for providing game(s) on the client device 102, including facilitating corresponding gameplay and facilitating invitation of additional players;

Game controller module 230 for providing a gameplay input interface to the game application(s) 228;

Data download module 231 for downloading data (e.g., game controller configurations 438 (FIG. 4), game applications 228 and other applications, updates to modules and applications and data in memory 206) from server 114 and other content hosts and providers; and client data 232 storing at least data associated with the game application 228 and other applications/modules, including:

Client device settings 234 for storing information associated with the client device 102 itself, including common device settings (e.g., service tier, device model, storage capacity, processing capabilities, communication capabilities, etc.);

Media device settings 236 for storing information associated with user accounts of the media device application 226, including one or more of account access information, and information for device settings (e.g., service tier, device model, storage capacity, processing capabilities, communication capabilities, etc.);

Game application(s) settings 238 for storing information associated with user accounts of the game application(s) 228, including one or more of account access information, in-game user preferences, gameplay history data, and information on other players;

Game controller configuration(s) 240 for storing information associated with configurations (e.g., received configurations from game controller configurations 438, FIG. 4) of game controller module 230 for game application(s) 228; and Location/proximity data 242 including information associated with the presence, proximity or location of any of the client device 102, the media device 106, and player client(s) 104.

In some implementations, the game controller module 230 is a part (e.g., a sub-module) of the media device application 226 or another application in memory 206. In some other implementations, the game controller module 230 is a part of the operating system 216. In some further implementations, the game controller module 230 is a distinct module or application.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 2B:
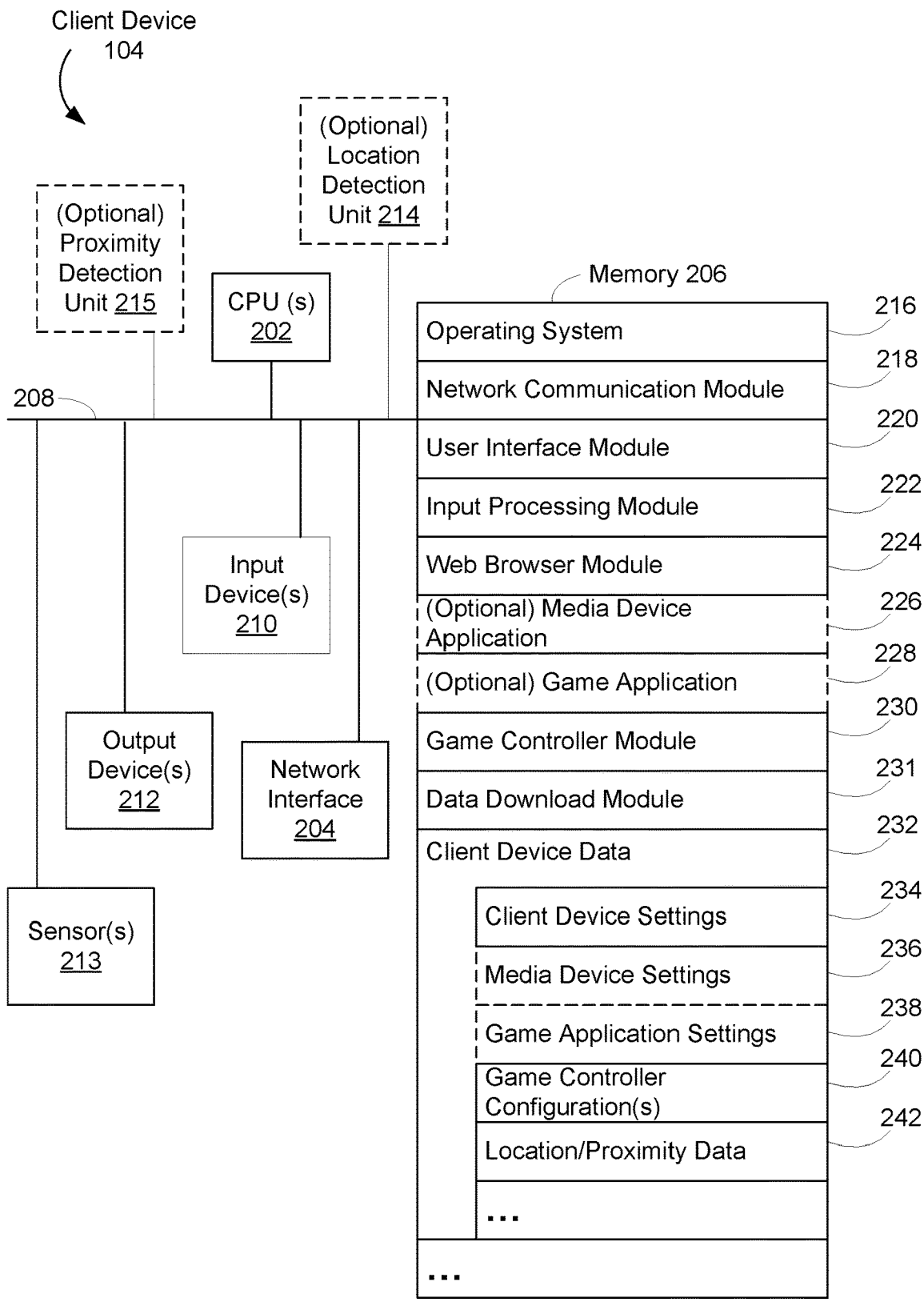

FIG. 2B is a block diagram illustrating an example player client 104 of gaming environment 100 in accordance with some implementations. The player client 104 is similar to host client 102; the player client 104 has similar components, modules, and data as host client 102. In player client 104, however, the media device application 226 (and correspondingly media device settings 236) and game application 228 (and correspondingly game application settings 238) are optional. Depending on the particular game to which the player client 104 is invited to join, the media device application 226 and the game application 228 are not required to play. If any of these applications are needed for playing the game (e.g., the game uses a game controller module 230 within the media device application 226), and the application is not in memory 206, the player client 104 may be prompted to download the application.

Figure 3:
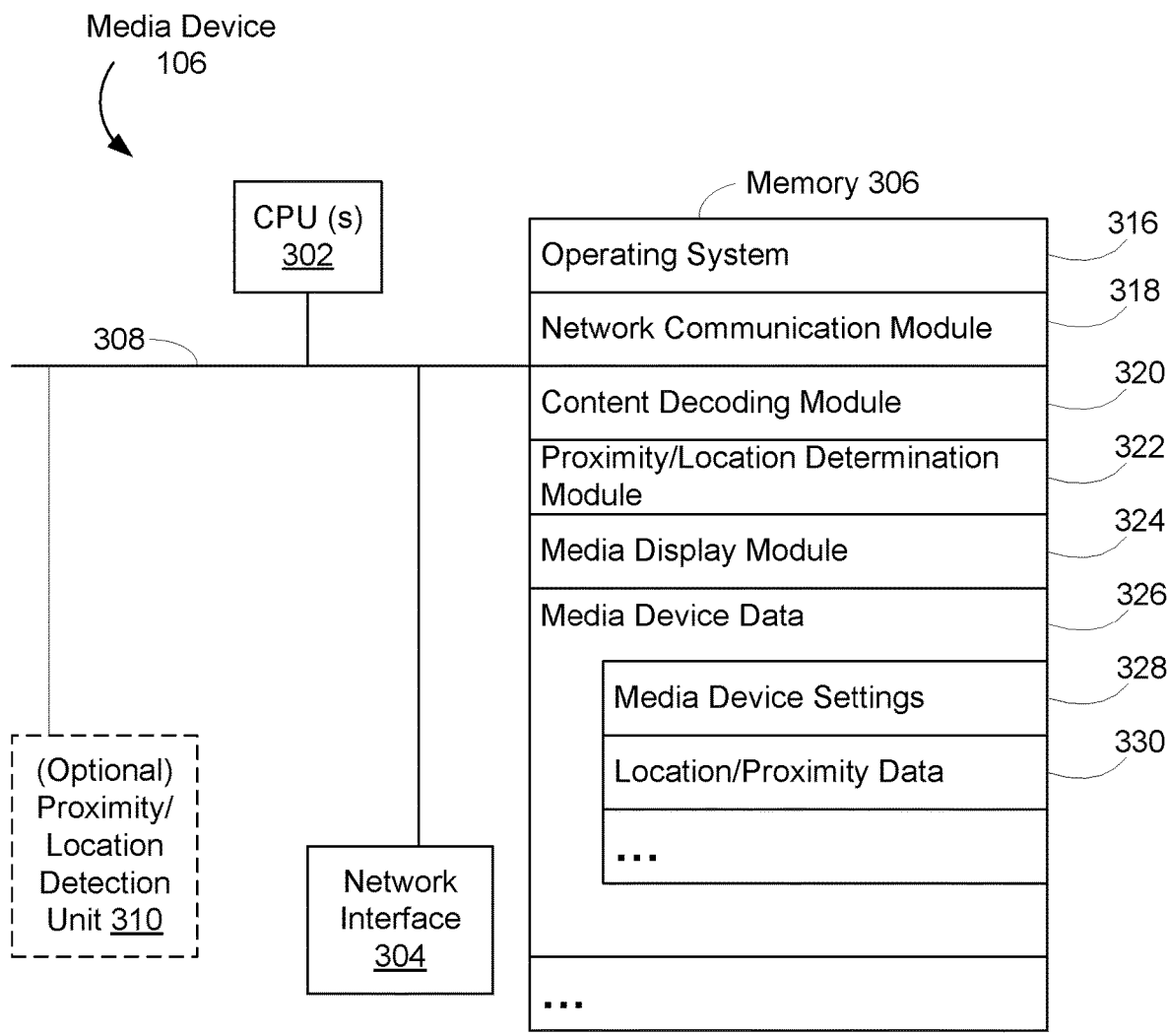
FIG. 3 is a block diagram illustrating an example media device in accordance with some implementations.

FIG. 3 is a block diagram illustrating an example media device 106 of gaming environment 100 in accordance with some implementations. The media device 106, typically, includes one or more processing units (CPUs) 302, one or more network interfaces 304, memory 306, and one or more communication buses 308 for interconnecting these components (sometimes called a chipset). Optionally, the media device 106 includes a proximity/location detection unit 310, such as an IR sensor, for determining the proximity of a client device 102 or 104.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

Operating system 316 including procedures for handling various basic system services and for performing hardware dependent tasks;

Network communication module 318 for connecting the media device 106 to other computers or systems (e.g., the server system 114, and the client device 102) via one or more network interfaces 304 (wired or wireless) and one or more networks 112, such as the Internet, other wide area networks, local area networks, metropolitan area networks, cable television systems, satellite television systems, IPTV systems, and so on;

Content Decoding Module 320 for decoding content signals received from one or more content sources (e.g., server 114 for output from the game session 116) and outputting the content in the decoded signals to an output device 108 coupled to the media device 106;

Proximity/location determination module 322 for determining the proximity of the client device 102 and/or 104 based on proximity related information that is detected by the proximity detection unit 310 or provided by the server system 114;

Media display module 324 for controlling media display; and

Media device data 326 storing at least data including:
  Media device settings 328 for storing information associated with user accounts of a media device application, including one or more of account access information and information for device settings (e.g., service tier, device model, storage capacity, processing capabilities, communication capabilities, etc.); and
  Location/proximity data 330 including information associated with the presence, proximity or location of any of the client device 102 and/or 104, and the media device 106.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 4:
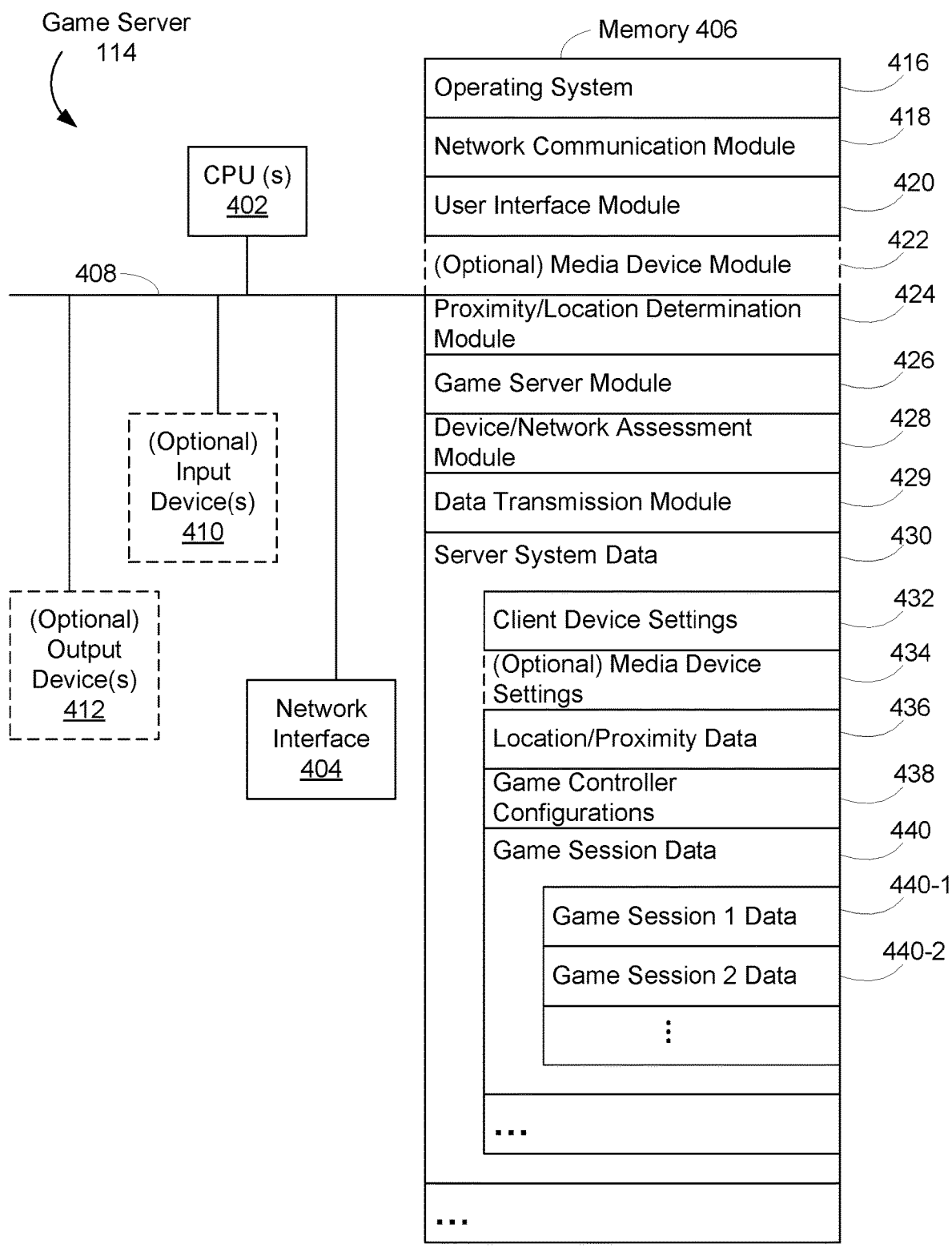
FIG. 4 is a block diagram illustrating an example server in accordance with some implementations.

FIG. 4 is a block diagram illustrating an example server in the server system 114 of gaming environment 100 in accordance with some implementations. The server 114, typically, includes one or more processing units (CPUs) 402, one or more network interfaces 404, memory 406, and one or more communication buses 408 for interconnecting these components (sometimes called a chipset). The server 114 may optionally include one or more input devices 410 that facilitate user input, such as a keyboard, a mouse, a voice-command input unit or microphone, a touch screen display, a touch-sensitive input pad, a gesture capturing camera, or other input buttons or controls. Furthermore, the server 114 may use a microphone and voice recognition or a camera and gesture recognition to supplement or replace the keyboard. In some implementations, the server 114 optionally includes one or more cameras, scanners, or photo sensor units for capturing images, for example, of graphic series codes printed on the electronic devices. The server 114 may also include one or more output devices 412 that enable presentation of user interfaces and display content, including one or more speakers and/or one or more visual displays.

Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

Operating system 416 including procedures for handling various basic system services and for performing hardware dependent tasks;

Network communication module 418 for connecting the server system 114 to other devices (e.g., various servers in the server system 114, the client device 102 and/or 104, and the media device 108) via one or more network interfaces 404 (wired or wireless) and one or more networks 112, such as the Internet, other wide area networks, local area networks, metropolitan area networks, and so on;

User interface module 420 for enabling presentation of information (e.g., a graphical user interface for presenting application(s), widgets, websites and web pages thereof, and/or games, audio and/or video content, text, etc.) at the client device 102 and/or 104;

Media device module 422 (optional) that is executed to provide server-side functionalities for device provisioning, device control, and user account management associated with media device(s) 106;

Proximity/location determination module 428 for determining the proximity of the client device 102 and/or 104 to the media device 106 based on location information of any of the client device 102 and/or 104 and the media device 106;

Game server module 426 for providing server-side functionalities associated with games (e.g., game application(s) 228), including but not limited to setting up game sessions 440, storing game state data and other game-related data, processing gameplay inputs from client device 102 and 104, and rendering gameplay outputs, Device/network assessment module 428 for assessing device and network capabilities of client device 102 and/or 104, including but not limited to assessing network bandwidth of the connection to the client device 102/104 and assessing whether the client device 102/104 has the needed module or application to play a game;

Data transmission module 429 for providing data (e.g., game controller configurations 438), software updates, etc.) to client devices 102/104; and Server system data 430 including:
  Client device settings 432 for storing information associated with the client devices 102 and 104, including common device settings (e.g., service tier, device model, storage capacity, processing capabilities, communication capabilities, etc.);
  Media device settings 434 (optional) for storing information associated with user accounts of the media device application 422, including one or more of account access information and information for device settings (e.g., service tier, device model, storage capacity, processing capabilities, communication capabilities, etc.);
  Location/proximity data 436 including information associated with the presence, proximity or location of any of the client device 102 and/or 104 and the media device 106;

Game controller configurations 438 for storing controller configurations for various games; and Game session data 440 for storing data associated with game sessions (e.g., game state data, other game-related data), including for example data 440-1 for a first game session and data 440-2 for a second game session.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

FIGS. 5A-5B illustrate example user interfaces for inviting players to a game session in accordance with some implementations. FIG. 5A illustrates a user interface 500 displayed on a host client (e.g., client device 102). In some implementations, the user interface 500 is a user interface of the game application 228. The user interface 500 facilitates invitation of one or more player users to a game session by the host user. The user interface 500 includes an affordance 502 to have a link associated with the game session (e.g., a shortlink 512, FIG. 5B; a QR code encoding of the shortlink) sent to a media device (e.g., media device 106), which then outputs the link to an output device (e.g., output device 108) for display. The user interface 500 also includes an affordance 504 to send the link associated with the game session in a message (e.g., a text message) to player clients 104 of player users the host user wishes to invite to the game session. The host user may select either affordance 502 or 504 to invite player users, depending on the circumstances. For example, if the player users are in the same room as the host user, the host user may select the affordance 502 to have the game session link displayed for the player users to enter (e.g., type with a virtual keyboard) into their player clients 104. If the player users are remote from the host user, or if entering a link is inconvenient, then the link may be sent in messages to the player client(s) 104.

FIG. 5B illustrates a user interface 510 displayed on an output device 108 (e.g., television, computer monitor) coupled to media device 106. The user interface 510 includes a shortlink 512 that is displayed. User interface 510 (and shortlink 512) is displayed in accordance with the activation of affordance 502; the shortlink 512 is transmitted to the media device 106, which generates user interface 510 and inserts the shortlink 512 into the user interface 510, and outputs the user interface 510 including the shortlink 512 to the output device 108 for display. The shortlink 512 may be displayed as a textual link (which the player user(s) would input into a web browser module at the player client(s)), or as a barcode that the player client(s) may scan at the player user's direction.

Figure 5D:
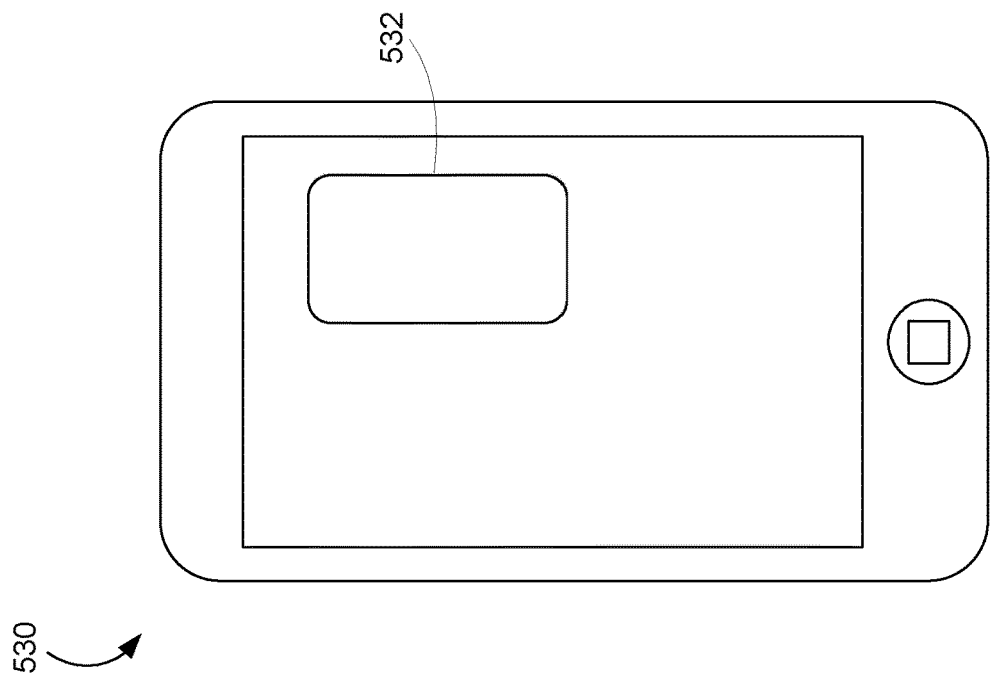
FIGS. 5C-5F illustrate example game controller interfaces in accordance with some implementations.
Figure 5C:
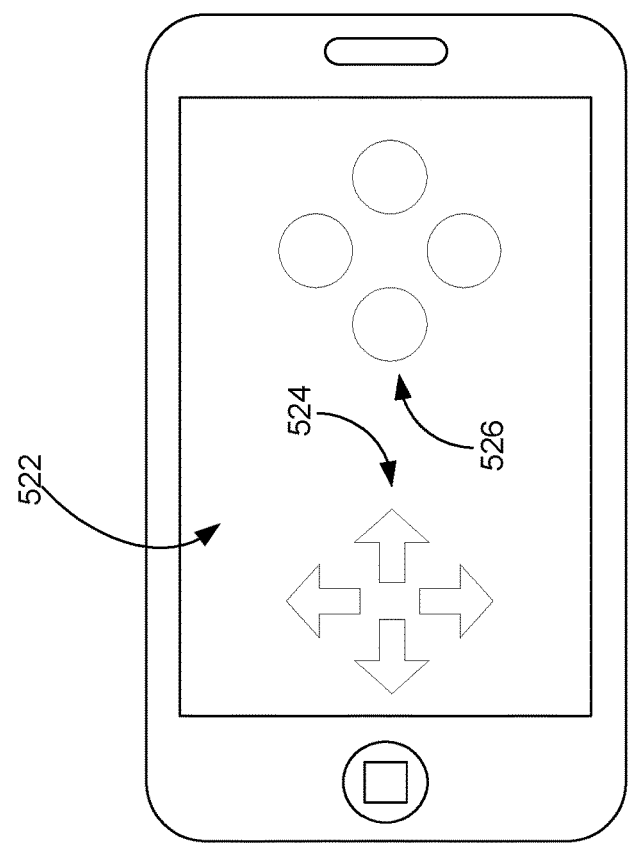

FIGS. 5C-5F illustrate example game controller configurations in accordance with some implementations. FIG. 5C illustrates a controller interface 520 displayed on a client device (e.g., host client 102, player client 104). The controller interface 520 includes a standardized controller region 522, which includes virtual directional pad 524 and virtual buttons 526. For controller interface 520, the user holds the client device as if holding a physical game controller and interacts with the virtual directional pad 524 and virtual buttons 526 as if operating a directional pad and buttons on a physical game controller. In some implementations, the controller interface 520 is associated with a respective game controller configuration 438 applicable to the game controller module 230, and is a standardized controller interface usable by multiple games.

FIG. 5D illustrates a controller interface 530 displayed on a client device (e.g., host client 102, player client 104). Controller interface 530 includes a virtual button 532. A user holds in one hand the client device displaying the controller interface 530 such that the user can activate virtual button 532 with a thumb from the hand, and user can impart motion and optionally orientation change to the client device (e.g., swing like tennis racket, etc.). The motion and orientation change, which is detected by sensor(s) 213, may be used as input in a game. In some implementations, the controller interface 530 is associated with another respective game controller configuration 438 applicable to the game controller module 230, and is a standardized controller interface usable by multiple games that utilize device motion and/or orientation change as an input.

Figure 5E:
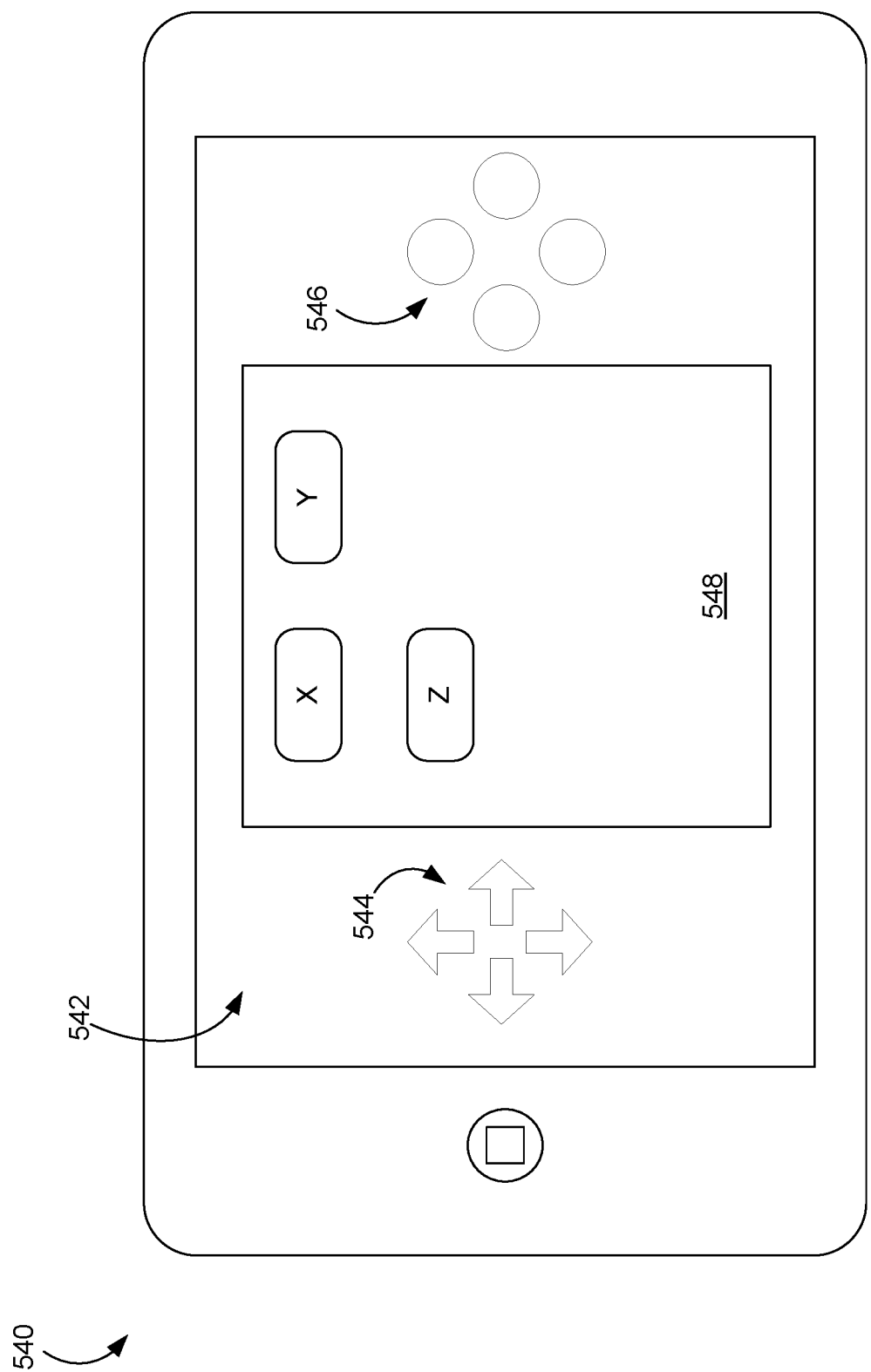

FIG. 5E illustrates a controller interface 540 displayed on a client device (e.g., host client 102, player client 104). The controller interface 540 includes a controller region 542 that may include standardized and/or customized elements. The controller region 542 may include standardized elements such as virtual directional pad 524 and virtual buttons 526. The controller interface 540 also includes a custom region 548 that is customizable, and is reserved for elements specified for a respective game. In some implementations, the entirety of controller interface 540, including regions 542 and 548, is customizable to the specific game. In some implementations, the controller interface 540 is associated with yet another respective game controller configuration 438 applicable to the game controller module 230, and is a custom controller interface specific to a particular game; server 114 may store within configurations 438 multiple configurations, where each of the multiple configurations corresponds to a customized configuration specific to a respective game.

Figure 5F:
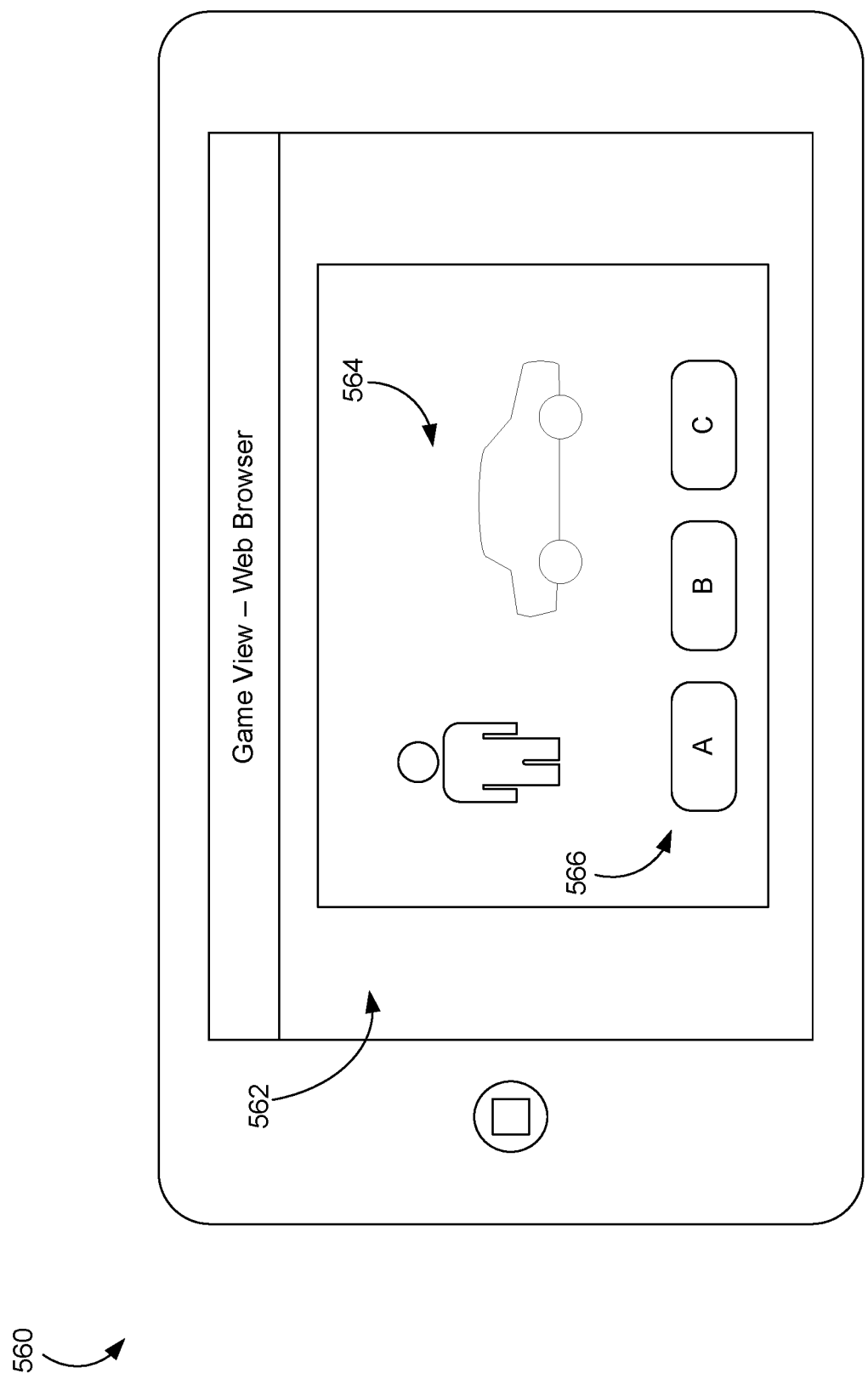

FIG. 5F illustrates a controller interface 560 displayed on a client device (e.g., host client 102, player client 104). The controller interface 560 includes a game view 562 that is displayed in a web browser (e.g., web browser module 224). The game view 562 includes game controls 566 (e.g., virtual buttons) and optionally rendered output 564 or other content (e.g., secondary information) from the game. In some implementations, the controller interface 560 may be used for games where latency poses less of an impact on gameplay.

Figure 6:
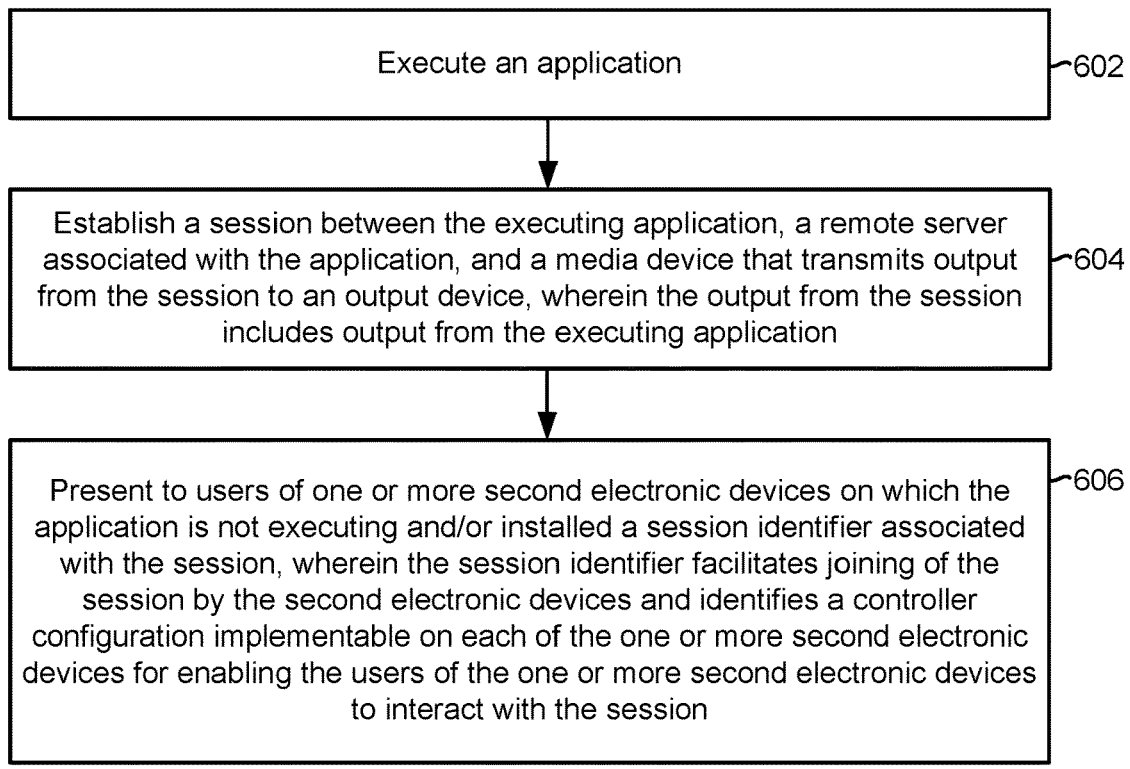
FIG. 6 is a flow diagram illustrating an example method for establishing an application session, in accordance with some implementations.

FIG. 6 is a flow diagram of a method 600 for establishing an application session, in accordance with some implementations. The method 600 may be performed at an electronic device (e.g., host client 102/132) having one or more processors and memory storing one or more programs for execution by the one or more processors. In some implementations, an electronic device includes one or more programs and memory storing one or more programs for execution by the one or more processors, and the one or more programs include instructions for performing the method 600. In some implementations, a non-transitory computer readable storage medium stores one or more programs, the one or more programs including instructions, which, when executed by an electronic device with one or more processors, causes the electronic device to perform the method 600.

The device executes (602) an application. The host client 102/132 executes an application (e.g., game application 228). The host user directs the host client to execute the application to initiate a session for the application in which player clients may be invited to join the session. The application may be an application (e.g., an application for an online or cloud-based, multi-player game) that facilitates interaction (e.g., gameplay), within an interactive session (e.g., a game session), by multiple users (e.g., multiple players) at multiple client devices in disparate locations. The devices participating in the application (or more particularly, in a respective session of the application) may include the host client 102/132 and one or more player clients 104/134. The player clients 104/134 may be invited into the session as described below.

The device establishes (604) a session between the executing application, a remote server associated with the application, and a media device that transmits output from the session to an output device, where the output from the session includes output from the executing application. The host client 102/132 establishes a session (e.g., session 116/146) between the executing application (e.g., game application 228), a server (e.g., server 114/144), and a media device (e.g., media device 106/136). The media device 106/136 transmits output from the application within the session to an output device 108/138. The server 114/144 is associated with the application (e.g., the server 114/144 is a game server associated with the game application 228). For example, when the game application 228 is executed at the host client 102/132, the game application 228 communicates with the server 114/144 to establish a game session. The game application 228 also communicates with the media device 106/136 to onboard the media device 106/136 into the session, with the media device 106/136 being a device to which the server 114/144 transmits output and other content from the gaming session for output (e.g., at the output device 108/138).

The device presents (606) to users of one or more second electronic devices on which the application is not executing and/or installed a session identifier associated with the session, wherein the session identifier facilitates joining of the session by the second electronic devices and identifies a controller configuration implementable on each of the one or more second electronic devices for enabling the users of the one or more second electronic devices to interact with the session. For example, the host client 102/132 transmits, or causes to be transmitted, to one or more player clients 104/134 on which the application is not installed at all or is installed but not executing a session identifier of the session. The session identifier facilitates joining of the session by the player clients 104/134, including facilitating installation of the application on a player client if not already installed. The session identifier also includes or references a controller configuration for the player clients 104/134 to implement in order to facilitate interaction by player users with the session. For example, the host client 102/132 obtains a session identifier of a game session from the server 114/144, and causes the session identifier to be transmitted to player clients 104/134 and/or to be output at output device 108/138 (e.g., in user interface 510, FIG. 5B) via media device 106/136. The host user may direct (e.g., via user interface 500, FIG. 5A), the host client 102/132 to transmit or cause to be transmitted the session identifier. The session identifier may be opened on-device at a player client 104/134, or input into an application at the player client 104/134 in accordance with the outputted session identifier (e.g., the user types the session identifier into the application or scans the session identifier barcode with the player client 104/134). In this manner, the player client 104/134 may join the game session. Furthermore, in accordance with a controller configuration specified by the session identifier and/or the game session, the player client(s) 104/134 implement a controller interface for the game session. With the player client(s) 104/134 joined in the game session and a controller interface implemented at the player clients, player users at the player clients may play the game along with a host user at the host client.

In some implementations, the application is a game application. The application running on the host client 102/132 may be, for example, a game application 228. The session 116/146 is a gaming session, and output from the session includes graphical output resulting from the playing of the game at the host client and player client(s). The output from the session may be output at output device 108/138 via media device 106/136.

In some implementations, the session identifier includes a Universal Resource Locator (URL) for the session. The session identifier may be a URL that the player clients 104/134 may activate in a web browser module (e.g., web browser 224) to initiate a process for joining the session.

In some implementations, the session identifier includes a barcode encoding the URL associated with the session. The URL for the session may be encoded in a barcode (e.g., a linear barcode, a matrix barcode). A player client 104/134 may scan the barcode while the barcode is displayed to obtain the session identifier URL.

In some implementations, the session identifier is displayed at the second electronic devices in a prompt or a notification. The session identifier (e.g., the URL for the session or a barcode encoding the URL) may be displayed in a prompt or app notification. For example, the host client 102/132 transmits or causes to be transmitted the session identifier to a player client 104/134, where a prompt or notification with the session identifier is displayed.

In some implementations, presenting to users of one or more second electronic devices on which the application is not executing and/or installed a session identifier associated with the session includes transmitting the session identifier to the media device, wherein the media device is configured to transmit the session identifier to the output device. The host client 102/132 transmits or causes to be transmitted the session identifier to a media device 106/136 that is also a part of the session 116/146, which transmits the session identifier to the output device 108/138 for output. For example, the output device 108/138 displays the session identifier as a barcode that a player client 104/134 can read or as a URL link that may be opened in a web browser module 224 at the player client 104/134 to join the session.

In some implementations, presenting to users of one or more second electronic devices on which the application is not executing and/or installed a session identifier associated with the session includes transmitting the session identifier to the second electronic devices in a message. The host client 102/132 transmits or causes to be transmitted the session identifier to a player device 104/134 in a message (e.g., text message, instant message, email). For example, the player client 104/134 receives a message with the session identifier URL link, and the session identifier URL link may be opened in a web browser 224 at the player client 104/134 to join the session.

Figure 7:
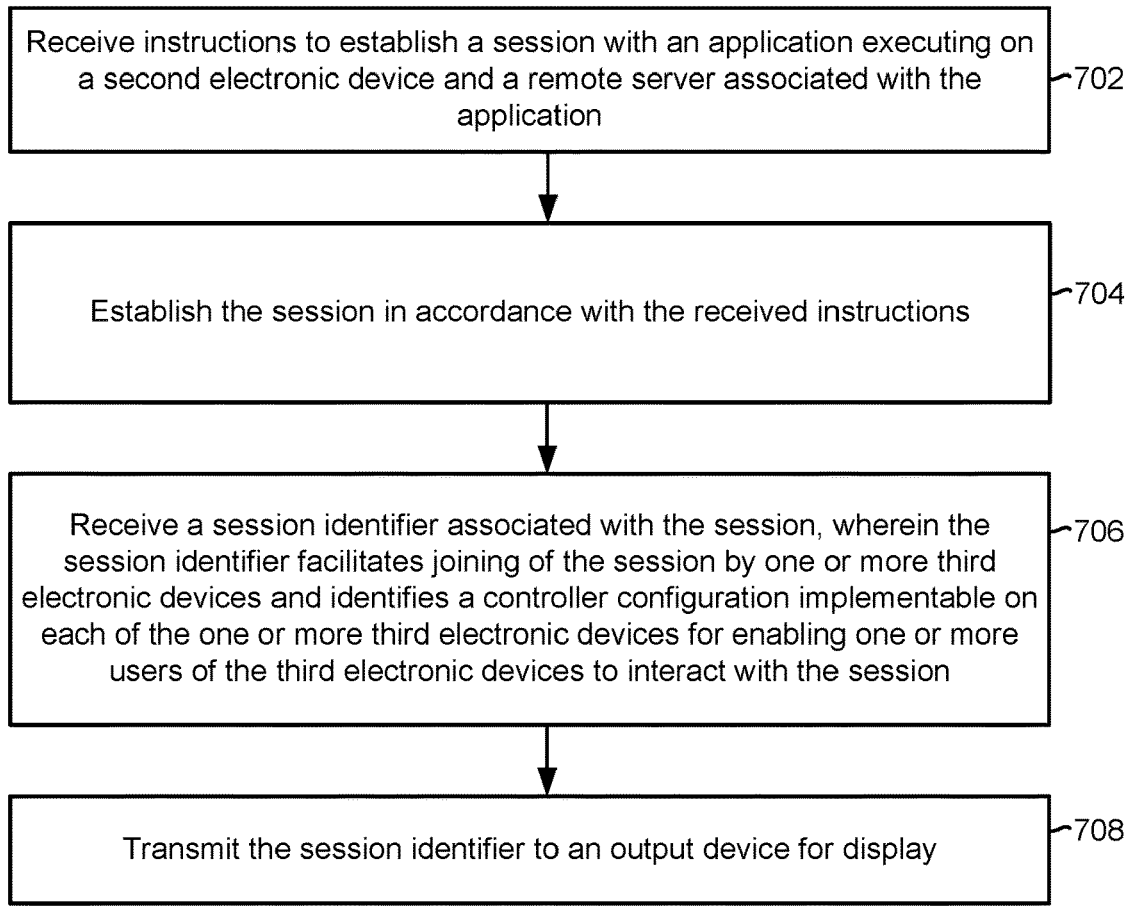
FIG. 7 is a flow diagram illustrating an example method for presenting a session identifier in accordance with some implementations.

FIG. 7 is a flow diagram of a method 700 for presenting a session identifier in accordance with some implementations. The method 700 may be performed at an electronic device (e.g., media device 106/136) having one or more processors and memory storing one or more programs for execution by the one or more processors. In some implementations, an electronic device includes one or more programs and memory storing one or more programs for execution by the one or more processors, and the one or more programs include instructions for performing the method 700. In some implementations, a non-transitory computer readable storage medium stores one or more programs, the one or more programs including instructions, which, when executed by an electronic device with one or more processors, causes the electronic device to perform the method 700.

The device receives (702) instructions to establish a session with an application executing on a second electronic device and a remote server associated with the application. A media device 106/136 receives instructions to establish a session 116/146 with an application (e.g., game application 228) on a host client 102/132 and with a server 114/144. The instructions may be received from the host client 102/132 or the server 114/144. In some implementations, in a game session for a game application 228, the output from the game session is displayed at one output location (e.g., output device 108/138 via media device 106/136) rather than at the host clients and player clients (e.g., so that the displays at the host client and player clients may be dedicated to displaying a controller interface (e.g., controller interfaces as shown in FIGS. 5C-5F) with which the host user and player users play the game). Thus, the media device 106/136 is invited to join the game session as an outlet for output from the game session.

The device establishes (704) the session in accordance with the received instructions. The media device 106/136 establishes or joins the session 116/146 with the application (e.g., game application 228) on the host client 102/132 and with the server 114/144.

The device receives (706) a session identifier associated with the session, wherein the session identifier facilitates joining of the session by one or more third electronic devices and identifies a controller configuration implementable on each of the one or more third electronic devices for enabling one or more users of the third electronic devices to interact with the session. The media device 106/136 receives, from the host client 102/132 or the server 114/144, a session identifier for the session. The session identifier facilitates joining of the session by one or more player clients 104/134. The session identifier may also identify or reference a controller configuration to be implemented at the player clients 104/134 within the session to enable player users of the player clients 104/134 to interact with the session. For example, the host user may direct (e.g., via user interface 500, FIG. 5A) the host client 102/132 to cause the session identifier to be transmitted to (e.g., casted to) the media device 106/136. In accordance the host user's direction, the host client 102/132 causes the session identifier to be transmitted to the media device 106/136.

The device transmits (708) the session identifier to an output device for display. The media device 106/136 transmits the session identifier to an output device 108/138, and the output device 108/138 displays the session identifier for input into or recognition (e.g., scanning) by player clients 104/134. The player user(s) may manually input the session identifier into the player client(s) 104/134, or input by scanning (e.g., barcode scanning or text recognition) with the player client(s) 104/134 the session identifier.

In some implementations, the device receives data corresponding to output from the session, the output including output resulting from interaction with the session by the one or more users of the third electronic devices, and transmits the data to the output device for display. The media device 106/136 receives output from the session resulting from the interaction with the session by the player clients 104/134. The media device 106/136 transmits the session output to the output device 108/138, and the output device 108/138 displays the session output.

In some implementations, the session identifier includes a URL associated with the session. The session identifier may be a URL that may be input into a web browser module at a player client 104/134 to join the session. In some implementations, the displayed session identifier URL may be input by text recognition (e.g., an image of the URL text is captured by the player client 104/134 and the URL text is recognized).

In some implementations, the session identifier includes a barcode encoding the URL associated with the session. The session identifier URL may be encoded into a barcode (e.g., linear barcode, matrix barcode). The barcode is transmitted to, and displayed by, the output device 108/138. A player client 104/134 may scan the barcode while the barcode is displayed to obtain the session identifier URL.

In some implementations, the electronic device is a casting device. The media device 106/136 may be a casting device (e.g., CHROMECAST by Google Inc.).

In some implementations, the application is a game application. The application may be a game application (e.g., game application 228). The session 116/146 is a gaming session, and output from the session includes graphical output resulting from the playing of the game at the host client and player client(s).

Reference have been made in detail to various implementations, examples of which are illustrated in the accompanying drawings. In the above detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

It will be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, without changing the meaning of the description, so long as all occurrences of the first device are renamed consistently and all occurrences of the second device are renamed consistently. The first device and the second device are both device, but they are not the same device.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
    establishing a game session between a game application executing on a first electronic client device and a server associated with the game application;
    causing a virtual game controller configuration to be provided to a second electronic client device, the virtual game controller configuration comprising a virtual game controller for the second electronic client device based on available device resources of the second electronic client device; and
    causing a session identifier associated with the game session to be provided to the second electronic client device, wherein the session identifier identifies the game session and the virtual game controller configuration implementable on the second electronic client device; and
    wherein the virtual game controller configuration is configured to facilitate a user of the second electronic client device to interact with the game session.

2. The method of claim 1, wherein the game application is a multi-player game application that facilitates interaction between the first electronic client device and the second electronic client device by configuring a virtual game controller interface associated with the virtual game controller configuration.

3. The method of claim 1, wherein the session identifier includes a Universal Resource Locator (URL) associated with the game session.

4. The method of claim 3, wherein the session identifier includes a barcode encoding the URL associated with the game session.

5. The method of claim 1, wherein the session identifier is configured to be displayed at the second electronic client device in a prompt or a notification.

6. The method of claim 1, further comprising:
    transmitting the session identifier to a media device in electronic communication with the first electronic client device, wherein the media device is configured to transmit the session identifier to an output device in electronic communication with the first electronic client device.

7. The method of claim 1, further comprising:
    transmitting the session identifier to the second electronic client device in a short message service (SMS) message.

8. A first electronic client device, comprising:
    one or more processors;
    memory coupled to the one or more processors and storing one or more instructions executable by the one or more processors to cause the first electronic client device to:
        establish a game session between a game application executing on the first electronic client device and a server associated with the game application;
        cause a virtual game controller configuration to be provided to a second electronic client device, the virtual game controller configuration comprising a virtual game controller for the second electronic client device based on available device resources of the second electronic client device; and
        cause a session identifier associated with the game session to be provided to the second electronic client device wherein the session identifier identifies the game session and the virtual game controller configuration implementable on the second electronic client device; and
        wherein the virtual game controller configuration is configured to facilitate a user of the second electronic client device to interact with the game session.

9. The first electronic client device of claim 8, wherein the game application is a multi-player game application that facilitates interaction between the first electronic client device and the second electronic client device by configuring a virtual game controller interface associated with the virtual game controller configuration.

10. The first electronic client device of claim 8, wherein the session identifier includes a Universal Resource Locator (URL) associated with the game session.

11. The first electronic client device of claim 10, wherein the session identifier includes a barcode encoding the URL associated with the game session.

12. The first electronic client device of claim 8, wherein the session identifier is configured to be displayed at the second electronic client device in a prompt or a notification.

13. The first electronic client device of claim 8, wherein the one or more instructions are further executable by the one or more processors to cause the first electronic client device to transmit the session identifier to a media device in electronic communication with the first electronic client device, wherein the media device is configured to transmit the session identifier to an output device in electronic communication with the first electronic client device.

14. The first electronic client device of claim 8, wherein the one or more instructions are further executable by the one or more processors to cause the first electronic client device to transmit the session identifier to the second electronic client device in a short message service (SMS) message.

* * * * *